United States Patent
Konyo et al.

(10) Patent No.: US 12,482,335 B2
(45) Date of Patent: Nov. 25, 2025

(54) VIBRATION CONTROL APPARATUS, VIBRATION CONTROL PROGRAM, AND VIBRATION CONTROL METHOD

(71) Applicant: TOHOKU UNIVERSITY, Sendai (JP)

(72) Inventors: Masashi Konyo, Sendai (JP); Kosuke Yamaguchi, Sendai (JP); Nan Cao, Sendai (JP); Satoshi Tadokoro, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 739 days.

(21) Appl. No.: 17/690,983

(22) Filed: Mar. 9, 2022

(65) Prior Publication Data

US 2022/0198891 A1    Jun. 23, 2022

Related U.S. Application Data

(63) Continuation of application No. PCT/JP2020/040520, filed on Oct. 28, 2020.

(30) Foreign Application Priority Data

Oct. 28, 2019 (JP) ................................ 2019-195595
Sep. 30, 2020 (JP) ................................ 2020-165991

(51) Int. Cl.
*G08B 6/00* (2006.01)
*G05D 19/02* (2006.01)
*G06F 3/01* (2006.01)

(52) U.S. Cl.
CPC ............... *G08B 6/00* (2013.01); *G05D 19/02* (2013.01); *G06F 3/016* (2013.01)

(58) Field of Classification Search
CPC ............ G08B 6/00; G05D 19/02; G06F 3/015
USPC ...................................................... 340/407.1
See application file for complete search history.

(56) References Cited

U.S. PATENT DOCUMENTS

| | | |
|---|---|---|
| 8,717,152 B2 | 5/2014 | Bhatia et al. |
| 9,064,387 B2 | 6/2015 | Bhatia et al. |
| 9,083,821 B2 | 7/2015 | Hughes |
| 9,448,626 B2 | 9/2016 | Cruz-Hernandez et al. |
| 9,606,627 B2 | 3/2017 | Bhatia et al. |
| 9,640,047 B2 | 5/2017 | Choi et al. |
| 9,898,085 B2 | 2/2018 | Saboune et al. |

(Continued)

FOREIGN PATENT DOCUMENTS

| | | |
|---|---|---|
| JP | 2004-181304 A | 7/2004 |
| JP | 2012-20284 A | 2/2012 |

(Continued)

OTHER PUBLICATIONS

International Preliminary Report on Patentability with the Written Opinion of the International Searching Authority issued by The International Bureau of WIPO for corresponding International Patent Application No. PCT/JP2020/040520, mailed on May 12, 2022, with an English translation.

(Continued)

*Primary Examiner* — Jack K Wang
(74) *Attorney, Agent, or Firm* — Myers Wolin, LLC

(57) ABSTRACT

A vibration control apparatus configured to control a vibration generated by a vibration apparatus, using a signal, includes processer circuitry, and an energy controller configured to convert a waveform of the signal while maintaining energy of the signal.

16 Claims, 24 Drawing Sheets

(56) References Cited

U.S. PATENT DOCUMENTS

| | | | |
|---|---|---|---|
| 10,055,950 | B2 | 8/2018 | Bhatia et al. |
| 10,079,925 | B2 | 9/2018 | Hosoi et al. |
| 10,319,199 | B2 | 6/2019 | Obana et al. |
| 10,339,772 | B2 | 7/2019 | Cruz-Hernandez et al. |
| 10,431,057 | B2 | 10/2019 | Bhatia et al. |
| 10,754,428 | B1 | 8/2020 | Parise et al. |
| 10,926,293 | B2 * | 2/2021 | Park .................. G06F 3/016 |
| 11,140,472 | B2 | 10/2021 | Chow et al. |
| 12,138,008 | B2 * | 11/2024 | Tran .................. A61B 5/6803 |
| 2004/0104625 | A1 | 6/2004 | Wakuda et al. |
| 2006/0119573 | A1 | 6/2006 | Grant et al. |
| 2012/0206246 | A1 | 8/2012 | Cruz-Hernandez et al. |
| 2012/0206247 | A1 | 8/2012 | Bhatia et al. |
| 2014/0152429 | A1 | 6/2014 | Bhatia et al. |
| 2015/0070260 | A1 | 3/2015 | Saboune et al. |
| 2015/0241975 | A1 | 8/2015 | Bhatia et al. |
| 2016/0012687 | A1 * | 1/2016 | Obana .................. G08B 6/00 340/407.1 |
| 2016/0027264 | A1 | 1/2016 | Choi et al. |
| 2017/0213430 | A1 | 7/2017 | Bhatia et al. |
| 2018/0210552 | A1 | 7/2018 | Saboune et al. |
| 2018/0335845 | A1 * | 11/2018 | Matsunami ......... G06F 3/03547 |
| 2019/0005782 | A1 | 1/2019 | Bhatia et al. |
| 2019/0310709 | A1 * | 10/2019 | Yamazaki ........... G06F 3/03547 |
| 2020/0096987 | A1 * | 3/2020 | Cella .................. H04L 67/12 |
| 2020/0209053 | A1 * | 7/2020 | Huang .................. H02K 11/35 |
| 2020/0356173 | A1 * | 11/2020 | Bajaj .................. H02P 7/025 |
| 2020/0379593 | A1 * | 12/2020 | de Vries ................ G06F 3/0412 |
| 2021/0110841 | A1 | 4/2021 | Weber et al. |

FOREIGN PATENT DOCUMENTS

| | | |
|---|---|---|
| JP | 2014-206403 A | 10/2014 |
| JP | 6361872 B2 | 7/2018 |
| JP | 6567809 B2 | 8/2019 |
| JP | 6584594 B2 | 10/2019 |
| KR | 10-1641418 B1 | 7/2016 |
| KR | 10-2212409 B1 | 2/2021 |

OTHER PUBLICATIONS

Taiwan Office Action issued by the Taiwan Patent Office for corresponding Taiwan Patent Application No. 109137466, dated Mar. 12, 2024, with an English translation of relevant parts.

Extended European Search Report with the Supplementary European Search Report and the European Search Opinion issued by the European Patent office corresponding European Patent Application No. 20882659.4, dated Nov. 8, 2023.

Takenouchi et al., "Extracting Haptic Information from High-Frequency Vibratory signals Measured on a Remote Robot to Transmit Collisions with Environments", Proceedings of the 2017 IEEE/SICE International Symposium on System Integration, Taipei, Taiwan, Dec. 11-14, 2017, 2017 IEEE.

Cao et al., "A Pilot Study: Introduction of Time-Domain Segment to Intensity-Based Perception Model of High-Frequency Vibration", Springer International Publishing AG, part of Springer Nature 2018, D. Prattichizzo et al. (Eds.): EuroHaptics 2018, LNCS 10893, pp. 321-332, 2018. https://doi.org/10.1007/978-3-319-93445-7_28.

Cao et al., "Sound reduction of vibration feedback by perceptually similar modulation", Proceedings of the 27th IEEE International Symposium on Robot and Human Interactive Communication, Nanjing, China, Aug. 27-31, 2018, 2018 IEEE.

Bensmaïa et al., "Vibrotactile intensity and frequency information in the Pacinian system: A psychophysical model", Perception & Psychophysics 2005, 67 (5), pp. 828-841, Copyright 2005 Psychonomic Society, Inc.

Notice of Reasons for Refusal issued by the Japan Patent Office for corresponding Japanese Patent Application No. 2019-195595, mailed on Oct. 11, 2021, with an English translation.

International Search Report issued by the Japan Patent Office for corresponding International Patent Application No. PCT/JP2020/040520, mailed on Jan. 12, 2021, with an English translation.

First Examination Opinion Notice issued by the China National Intellectual Property Administration for corresponding Chinese Patent Application No. 202080063178.4, dated Jun. 12, 2024, with an English translation of relevant parts.

Office Action issued by the Korean Patent Office for corresponding Korean Patent Application No. 10-2022-7007563, dated Mar. 17, 2025, with an English translation.

* cited by examiner

FIG.4
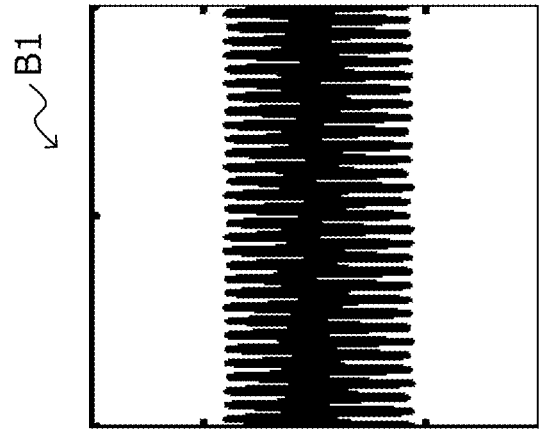
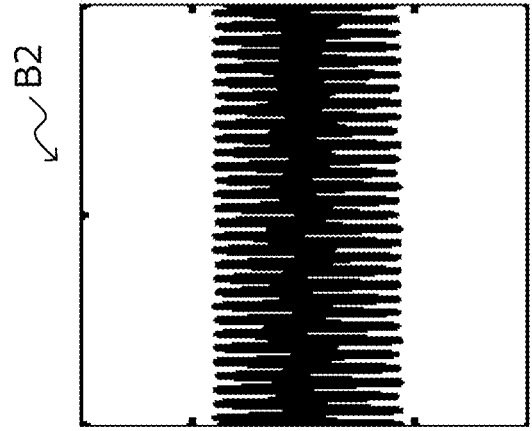
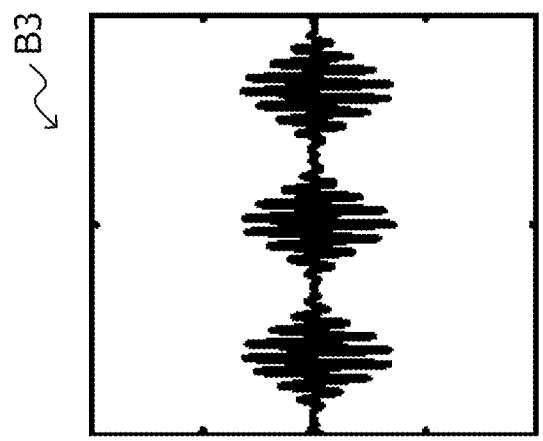

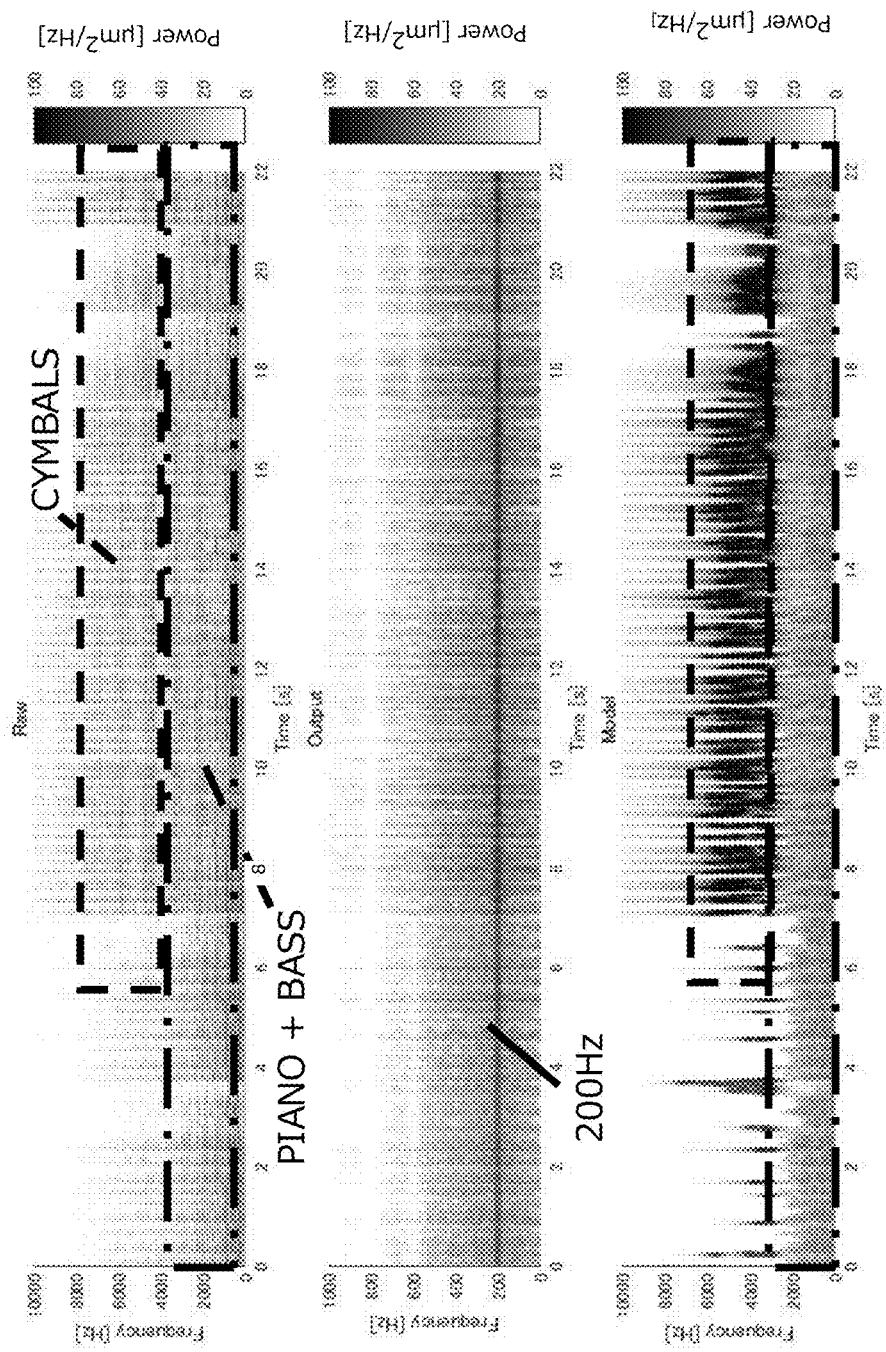

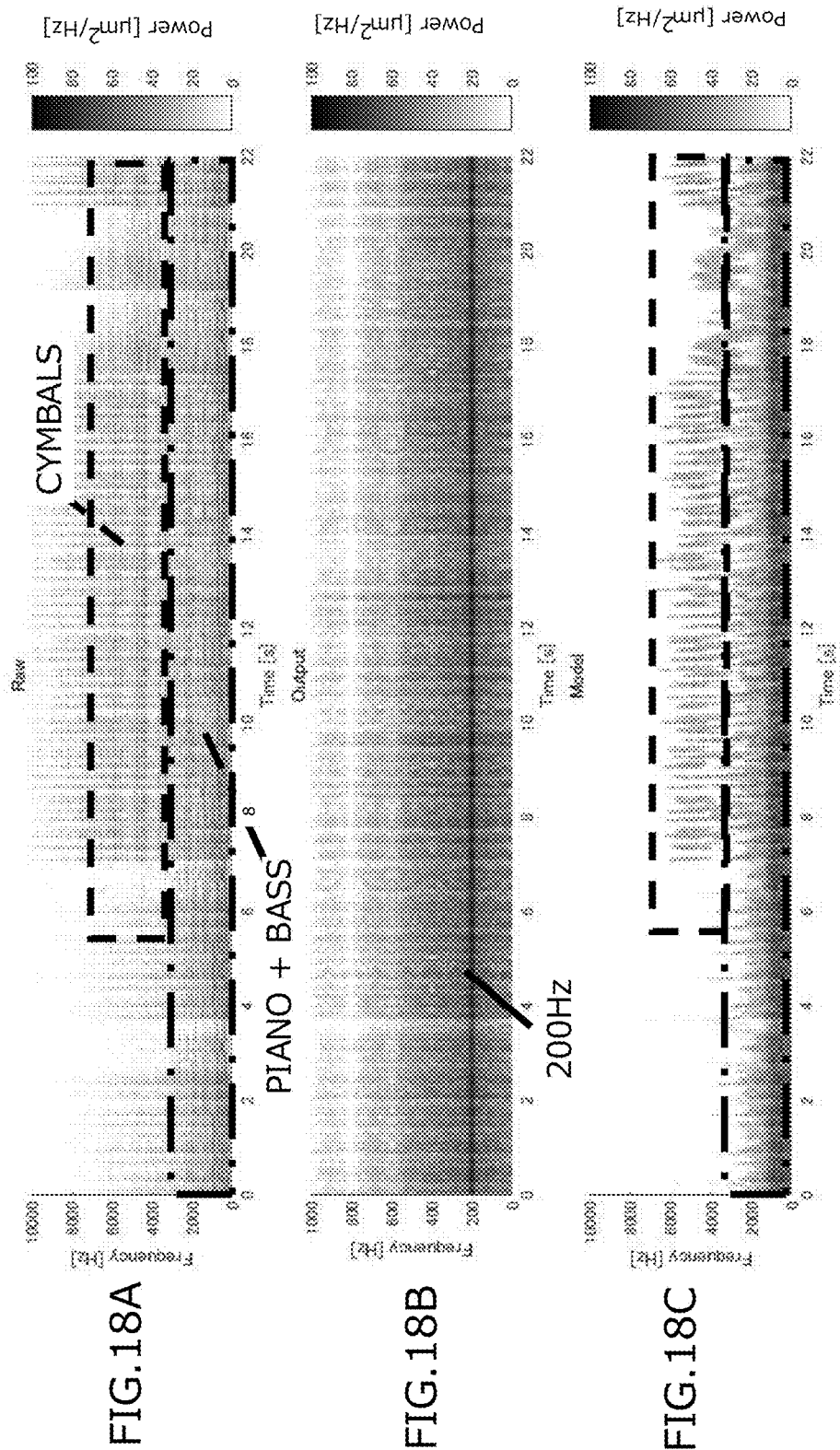

VIBRATION CONTROL APPARATUS, VIBRATION CONTROL PROGRAM, AND VIBRATION CONTROL METHOD

CROSS-REFERENCE TO RELATED APPLICATION

This application is a continuation of International Application No. PCT/JP2020/040520, filed on Oct. 28, 2020 and designated the U.S., which claims priority to Japanese Patent Application No. 2020-165991, filed on Sep. 30, 2020 and Japanese Patent Application No. 2019-195595, filed on Oct. 28, 2019, the entire contents of which are incorporated herein by reference.

FIELD

The technology described herein relates to a vibration control apparatus, a vibration control program, and a vibration control method.

BACKGROUND

In recent years, in the fields of smartphones, gaming machines, Virtual Reality (VR) apparatuses, robotic steering support, and the like, the enhancement of vibration feedback has been advanced. Specifically, a vibration device capable of presenting realistic tactile sensation by reproducing vibration in a wide frequency band has been developed.

Non-Patent Document 1: Hideto Takenouchi, Nan Cao, Hikaru Nagano, Masashi Konyo, Satoshi Tadokoro, the 2017 IEEE/SICE International Symposium on System Integration "Extracting Haptic Information from High-Frequency Vibratory signals Measured on a Remote Robot to Transmit Collisions with Environments", pp. 968-973, December, 2017

Non-Patent Document 2: Nan Cao, Hikaru Nagano, Masashi Konyo, Shogo Okamoto, Satoshi Tadokoro, "A Pilot Study: Introduction of Time-Domain Segment to Intensity-Based Perception Model of High-Frequency Vibration", June, 2018

Non-Patent Document 3: Nan Cao, Hikaru Nagano, Masashi Konyo, Satoshi Tadokoro, the 27th IEEE International Symposium on Robot and Human Interactive Communication "Sound reduction of vibration feedback by perceptually similar modulation", August, 2018

Non-Patent Document 4: Sliman Bensmaia, Mark Hollins, Jeffrey Yau, Attention, "Vibrotactile intensity and frequency information in the Pacinian system: A psychophysical model", Perception, & Psychophysics, Vol. 67, No. 5, pp 828-841, July, 2005

However, an attempt to present, for example, a high frequency vibration of 300 Hz or more, may cause device problems, sensory perception problems, and auditory noise problems. Since the amplitude of the vibrator is small in a high frequency band, it is not easy for a type of a device utilizing resonance to generate vibrations of both a high frequency band and a low frequency band. In addition, sufficient amplitude is required to make a human perceive vibration because human perception peaks at 200 to 300 Hz and weakens at the vibration frequency more than the peak. In addition, in the range of the frequency exceeding about 300 Hz, vibration comes to be audible as sound. For example, an attempt to generate a vibration in combination with a music or movie content is made, the vibration may be recognized as noise that disturbs the sound source of the music or movie content.

SUMMARY

In one aspect, a vibration control apparatus configured to control a vibration generated by a vibration apparatus, using a signal, the vibration controlling apparatus comprising: processer circuitry; and an energy controller configured to convert a waveform of the signal while maintaining energy of the signal.

In one aspect, a vibration of a high frequency band that are easily perceived by human can be generated.

BRIEF DESCRIPTION OF DRAWINGS

FIG. 4 is a diagram illustrating a sample waveform of the vibration used in a three-alternative forced choice discrimination experiment conducted to determine the discriminability shown in the graph of FIG. 3.

FIG. 16A, FIG. 16B and FIG. 16C are graphs illustrating a first example of emphasizing and separating a high-frequency component of 3000 Hz or more from a sound source;

FIG. 18A, FIG. 18B and FIG. 18C are graphs illustrating an example in which a low-frequency component of 1000 Hz or less emphasized in and basis signal from a sound source;

DESCRIPTION OF EMBODIMENT(S)

Figure 1:
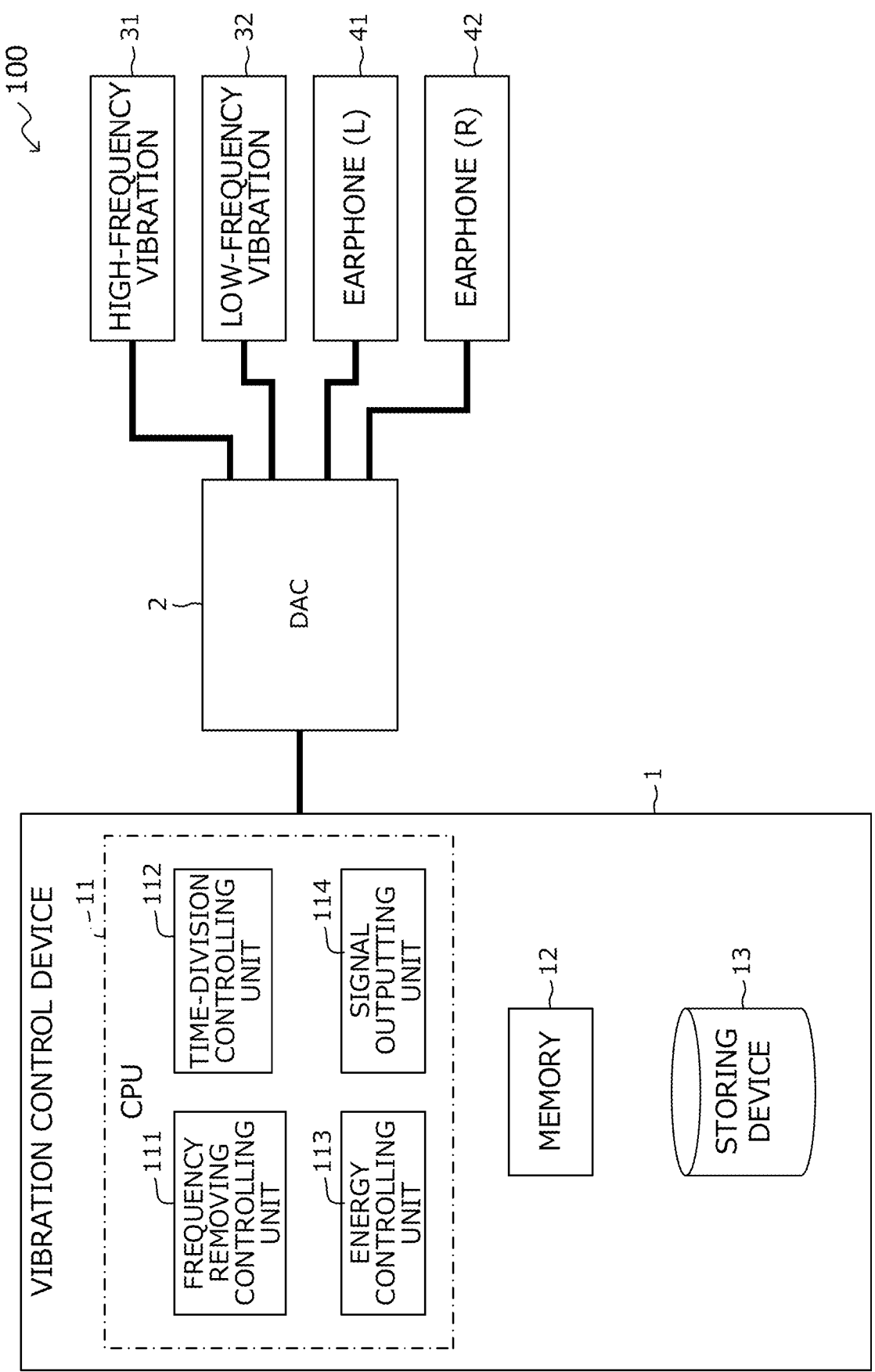
FIG. 1 is a block diagram schematically illustrating an example of the configuration of a vibration generating system according to an embodiment.

Hereinafter, an embodiment will now be described with reference to the accompanying drawings. However, the following embodiment is merely illustrative and is not intended to exclude the application of various modifications and technologies not explicitly described in the embodiment. Namely, the present embodiment can be variously modified and implemented without departing from the scope thereof.

Further, each of the drawings does not intend to include only the element appearing therein and therein to the elements illustrated in the drawing. Hereinafter, in the drawings, same reference numbers designate the same or similar parts, unless otherwise specified.

<A> Embodiment

FIG. 1 is a block diagram schematically illustrating an example of the configuration of a vibration generating system 100 according to an embodiment.

The vibration generating system 100 includes a vibration control apparatus 1, a Digital Analog Converter (DAC) 2, a high-frequency vibration 31, a low-frequency vibration 32, an earphone (L) 41, and an earphone (R) 42.

The DAC 2, which may be referred to as Universal Serial Bus (USB) audio, converts a digital signal input from the vibration control apparatus 1 into an analog signal. Then, the DAC 2 outputs the analog signal after the conversion to the high-frequency vibration 31, the low-frequency vibration 32, the earphone (L) 41 and the earphone (R) 42. In the subsequent stage of the DAC 2, a non-illustrated amplifier for driving the high-frequency vibration 31, the low-frequency vibration 32, the earphones (L) 41, and the earphones (R) 42 may be provided.

The low-frequency vibration 32 shown in FIG. 1 is an example of a first vibration apparatus and generates vibration due to signal components less than a predetermined frequency. The high-frequency vibration 31 shown in FIG. 1 is an example of a second vibration apparatus and generates vibration due to a signal component of the predetermined frequency or higher. The low-frequency vibration 32 may be omitted in the vibration generating system 100. In that case, vibration due to signal components below a predetermined frequency may be generated from the high-frequency vibration 31, or vibration due to signal components below the predetermined frequency may not be generated in the vibration generating system 100.

The predetermined frequency for separating a signal component of the vibration output from the low-frequency vibration 32 and a signal component of a signal output from the high-frequency vibration 31 may be a frequency in a range from 80 Hz to 400 Hz.

The earphone (L) 41 generates a sound to be input into the left ear of a person among a stereo sound source. The earphone (R) 42 generates a sound to be input into the right ear of a person among the stereo sound source. The earphone (L) 41 and the earphone (R) 42 may be omitted in the vibration generating system 100. The earphone (L) 41 and the earphone (R) 42 may be of a common shape to generate a monaural sound source. Further alternatively, the vibration generating system 100 may include a speaker in place of the earphone (L) 41 and the earphone (R) 42, or may output sound from a sound source of three or more channels.

The vibration control apparatus 1 includes a Central Processing Unit (CPU) 11, a memory 12, and a storing apparatus 13.

The vibration control apparatus 1 according to an example of the present embodiment may convert acoustic information such as music, movies, sounds, and the like into a tactile signal. In the frequency range exceeding about 300 to 400 Hz, vibration becomes audible as a sound, resulting in noise. Therefore, a vibration sensible apparatus for such as music and moving images in the related art removes a high-frequency band by applying a low-pass filter at about several hundred Hz. In contrast, the vibration control apparatus 1 of one example of the present embodiment converts a waveform of a high-frequency band into a waveform of a different frequency of a low-frequency band, and outputs the waveform of the low-frequency band obtained by the conversion.

Further, the vibration control apparatus 1 of one example of the present embodiment may modulate the high-frequency vibration generated when the robot contacts an object to a frequency band that can be perceived by human. Transmitting the vibration generated when the robot contacts an object to a remote operator makes the operator possible to grasp the strength of the collision with the object and the situation of the friction. When contacting an object, a robot like a construction robot which grasps a metal casing sometimes generates a vibration of a band which a human does not perceive. With the foregoing situation in view, the vibration control apparatus 1 of one example of the present embodiment modulates the frequency band of an output signal.

Furthermore, the vibration control apparatus 1 according to an example of the present embodiment may be applied to a chair, a suit, a headset, or the like including a vibration apparatus.

The memory 12 is a storing apparatus including a Read Only Memory (ROM) and a Random Access Memory (RAM).

The storing apparatus 13 is a apparatus that readably and writably stores data, and may be exemplified by a Hard Disk Drive (HDD), a Solid State Drive (SSD), and a Storage Class Memory (SCM). The storing apparatus 13 stores the generated teacher data, a learning model, and the like.

The CPU 11 is a processing apparatus that performs various controls and arithmetic operations, and achieves various functions by executing the Operating System (OS) and a program stored in the memory 12. Specifically, the CPU 11 may function as a frequency removing controlling unit 111, a time-division controlling unit 112, an energy controlling unit 113, and a signal outputting unit 114 as shown in FIG. 1.

The CPU 11 is an example of a computer, and illustratively controls the operation of the entire vibrating control apparatus 1. The apparatus that controls the operation of the entire vibration control apparatus 1 is not limited to the CPU 11, and may be, for example, any one of an MPU and a DSP, an ASIC, a PLD, an FPGA, and a dedicated processor. The apparatus that controls the operation of the entire vibration control apparatus 1 may be a combination of two or more of a CPU, an MPU and a DSP, an ASIC, a PLD, an FPGA, and a dedicated processor. Note that an MPU is an abbreviation of a Micro Processing Unit, a DSP is an abbreviation of a Digital Signal Processor, and an ASIC is an abbreviation of Application Specific Integrated Circuit. A PLD is an abbreviation of a Programmable Logic Device, and an FPGA is an abbreviation of a Field Programmable Gate Array.

The frequency removing controlling unit 111 removes a first signal component having a frequency equal to or lower than the predetermined frequency.

The time-division controlling unit 112 divides a second signal component except for the first signal component removed by the frequency removing controlling unit 111 at intervals of a predetermined time.

The energy controlling unit 113 converts the waveform of the second signal component while maintaining the energy of the second signal component at every predetermined time divided by the time-division controlling unit 112.

The signal outputting unit 114 outputs, in addition to the second signal component after the conversion of the waveform by the energy controlling unit 113, the first signal component removed by the frequency removing controlling unit 111.

Figure 2:
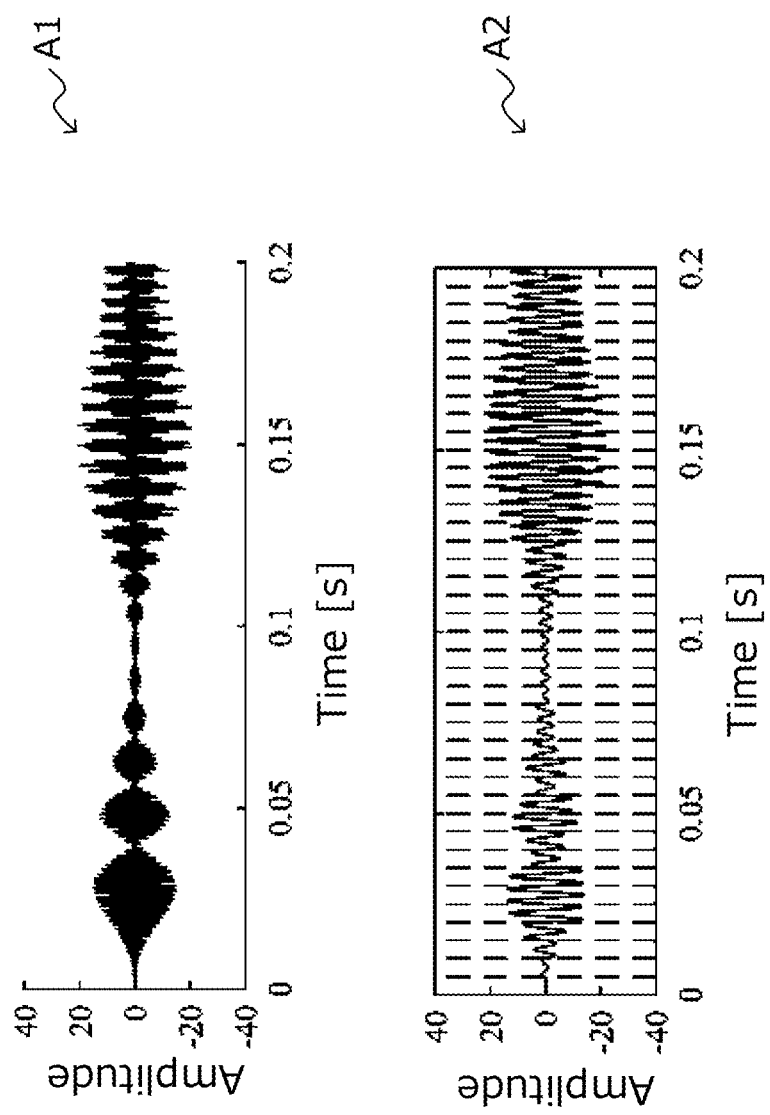
FIG. 2 is a graph showing waveform of a signal before and after conversion by a vibration control apparatus shown in FIG. 1.

FIG. 2 is a graph showing waveform of a signal before and after conversion by the vibration control apparatus 1 shown in FIG. 1.

The frequency band can be modified by replacing the waveform of the frequency band to another waveform having equivalent energy, considering human perception characteristics to a high-frequency vibration and focusing on vibration energy correlated with the human perception characteristics, rather than the waveform itself, for a high-frequency band. In the example shown in FIG. 2, a waveform of the reference number A1 is converted into a waveform of the reference number A2.

An arbitrary successive vibration signal can be converted into an arbitrary waveform while maintaining equivalent tactile sensation felt by human or allowing a high-frequency band, which is not easily felt by human, to be felt, by time-dividing the signal at appropriate intervals considering the human perception characteristic and converting the divided signal in a unit of each divided segment into vibration energy.

Proper selection of the frequency of the vibration after the conversion makes it possible to efficiently drive a vibrator according to the response range of the vibrator, to reduce the auditory noise, and to convert the frequency to an arbitrary sound source.

It is said that the human perception to a vibration is up to about 1 kHz. Therefore, vibrations above 1 kHz are often ignored. On the other hand, it is known that, if a vibration of 1 kHz or more is an amplitude modulated wave whose amplitude fluctuates in a band to the extent felt by human, the envelope component of the vibration can be perceived.

On the other hand, a vibration energy model (see, for example, the Cited Document 4) is known as human perception characteristics to a high-frequency vibration of about 100 Hz or more. Therefore, it has been found that the vibration is not distinguished even if the carrier frequency of the amplitude modulated wave is replaced while maintaining the high-frequency vibration energy (see, for example, Cited Document 2 and Cited Document 3). However, even if the vibration energy is maintained, the envelope component of the vibration can be perceived as a difference in tactile information in some cases as described above, and the perceivable range has not been investigated. In Cited document 2, although a method of converting a signal by time division based on vibration energy has been devised, a method of maintaining a low-frequency component has not been considered.

Figure 3:
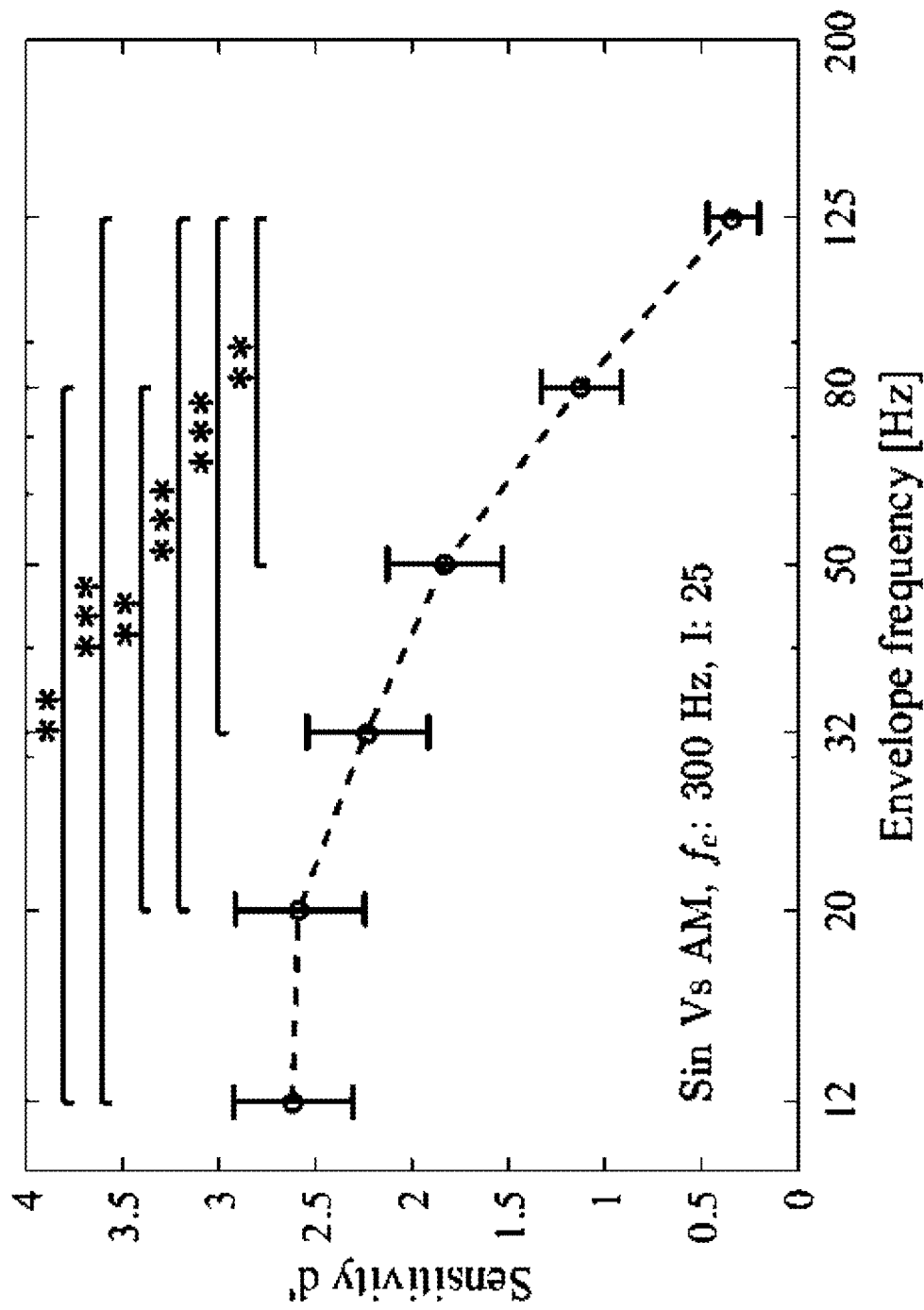
FIG. 3 is a graph showing the discriminability of a vibration by human.

FIG. 3 is a graph showing the discriminability of a vibration by human. FIG. 4 is a diagram illustrating a sample waveform of the vibration used in the three-alternative forced choice discrimination experiment conducted to determine the discriminability shown in the graph of FIG. 3.

The graph shown in FIG. 3 is obtained by investigating the human perception discriminability while maintaining vibration energy on the premise of a vibration energy model that has previously known (for example, see Cited Reference 4). The reference number B1 and the reference number B2 in FIG. 4 represent the same waveform, the reference number B3 in FIG. 4 represents a different waveform. The subject is caused to compare the constant amplitude fluctuation indicated by the reference numbers B1 and B2 in FIG. 4 with the amplitude modulated stimulus indicated by the reference number B3, and to answer which is the amplitude modulated wave. In FIG. 3, the correct answer rate obtained in the three-alternative forced choice discrimination experiment is represented by Sensitivity (d': d-prime), which is a discriminability index based on the signal-detection theory, and d' of 1 or less means that the correct answer rate is less than about 60%.

According to the graph shown in FIG. 3, the upper limit value of the discriminable frequency for the envelope component is about 80 to 125 Hz. It is also shown that there is no need to maintain the envelope components above this frequency upper limit and that stimuli are not discriminated if the carrier frequency of amplitude modulated wave is replaced while maintaining the vibration energy.

As mentioned above, when the energy fluctuates in the low frequency range even if the vibration energy is maintained, the fluctuation may be perceived as a difference in tactile information, but its perceivable range has not been investigated. Then, based on the finding that the upper limit of perceivable low-frequency fluctuation is approximately 80 to 125 Hz, the vibration energy is converted while maintaining the low-frequency component by two countermeasures (see countermeasures [1] and [2] to be described below).

Figure 5:
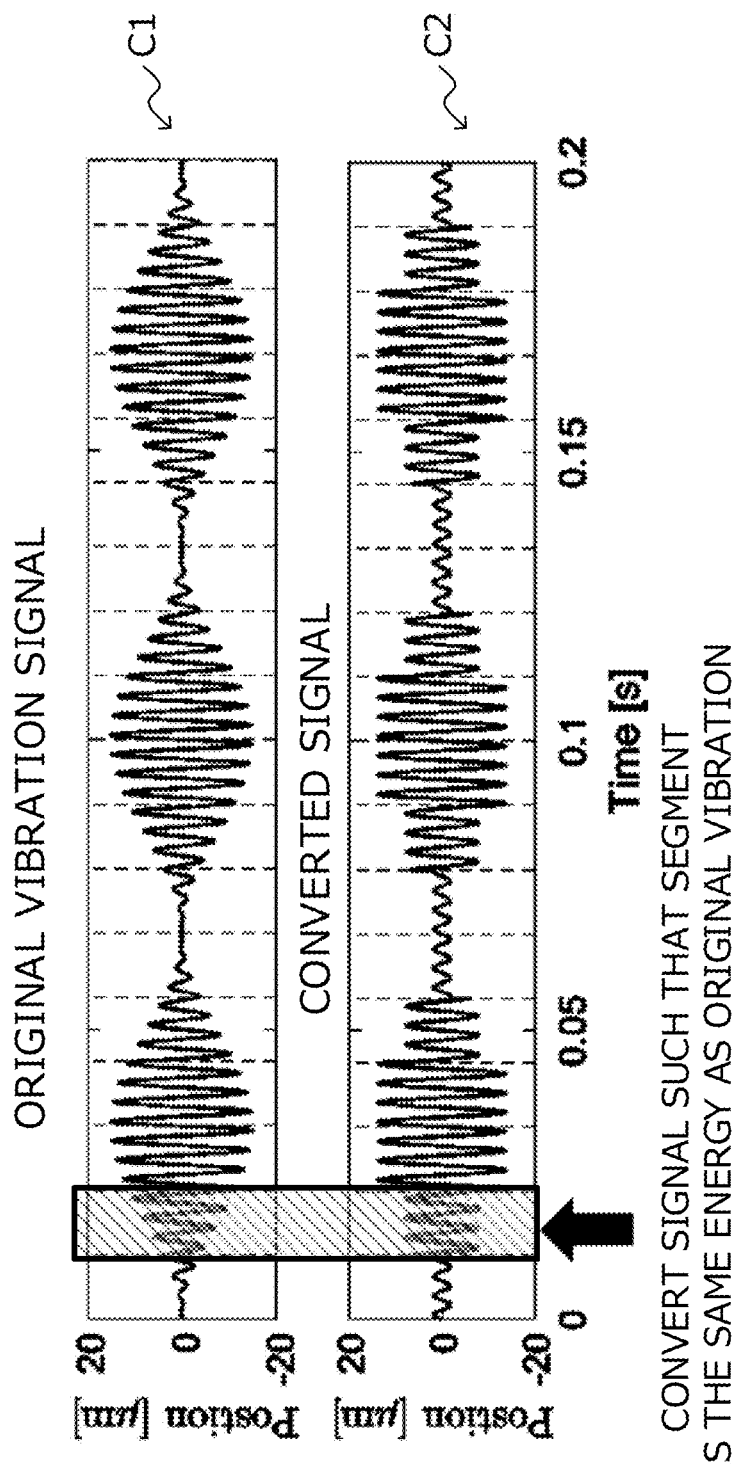
FIG. 5 is a graph illustrating a waveform of the signal before and after the conversion for each segment by the vibration control apparatus shown in FIG. 1.

FIG. 5 is a graph illustrating a waveform of the signal before and after the conversion for each segment by the vibration control apparatus 1 shown in FIG. 1.

Since the human perception to a high frequency is based on vibration energy rather than the waveform itself, the high frequency is perceived as the same sensation when the vibration energy is maintained. However, if the vibration energy fluctuates in the range of about 80-125 Hz or less, it is necessary to reproduce the fluctuation of vibration energy.

Therefore, in one example of the present embodiment, as a means for maintaining the fluctuation of the vibration energy of a predetermined frequency (e.g., about 80 to 125 Hz) or less, the vibration is time-divided in the section of for example, about 80 to 200 Hz, the vibration energy is obtained for each segment, and the vibration is converted into a vibration having a different carrier frequency.

In the example shown in FIG. 5, the original vibration signal represented by the reference number C1 is converted into a converted signal represented by the reference number C2 such that the converted signal has the same energy as the energy of the original vibration signal in the same time segment.

The width of the time division (in other words, the division width) may be set to such an extent that the energy fluctuation of 80 to 125 Hz or less can be expressed (in other words, to such an extent that the peaks of the fluctuation match) (countermeasure [1]). The frequency of the division width may be 80 to 125 Hz or more, but an excessive short division width worsens the estimation accuracy of the vibration energy of the longer cycle than the division width. Therefore, by the following countermeasure [2], the waveform of which energy is unable to be estimated is output without any modification.

In addition, a component having a frequency equal to or lower than the predetermined frequency may be extracted and the extracted component may be presented as a stimulus vibration without any modification (countermeasure [2]). Although the predetermined frequency may be 80 to 125 Hz or more, a component of a predetermined frequency component or more may be represented by the energy controlling unit 113 of the second signal component. This makes the frequency selection possible to have arbitrary. However, if the predetermined frequency is set to excessively high, a problem of noise may occur or a wide-band vibration apparatus may be required.

According to the above-described countermeasure [1] and countermeasure [2], a predetermined frequency may be about 80 to 400 Hz. 400 Hz is an upper limit in terms of a noise problem and the performance of the vibration apparatus.

The setting of the predetermined frequency also involves the selection of the carrier frequency used when the vibration is converted. Since the peak vibration frequency at which human perception is enhanced is around 200 to 250 Hz, it is practical to use a carrier frequency of about 150 to 400 Hz as a carrier frequency that is not noisy while increasing sensitivity. The carrier frequency may be a constant multiple of the division width. Further, multiple different frequencies may be used as the carrier frequency and may include a high frequency range of 400 Hz or more.

Further, a predetermined frequency for separating the low frequency and high frequency does not have to coincide with the frequency of the division width for calculating the energy.

According to the cited document 4, the compensation energy, which is the vibration energy compensated in order to enhance the human perceivability, can be expressed by the following Expression.

$$I_{pc} = \left(\frac{A^2}{T_f^2}\right)^{b_f}$$ [Expression 1]

The term A is the amplitude of the separated basis signals $g_k$. The term $T_f$ is the amplitude threshold and is the smallest amplitude that a human can feel in a signal having a frequency f. The term $b_f$ is an exponential value and is a nonlinear characteristic in a signal having a frequency f.

Figure 6:
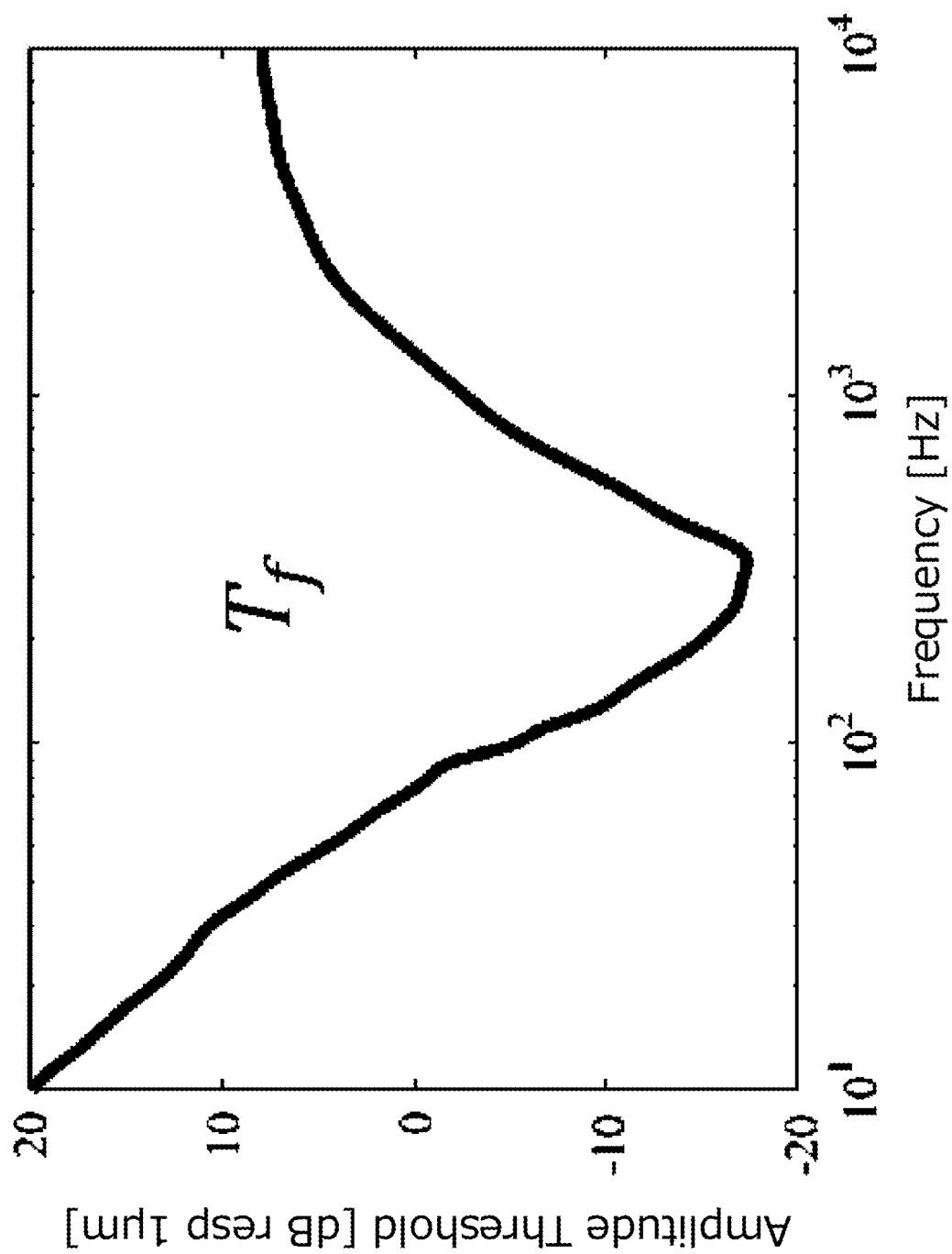
FIG. 6 is a graph illustrating an amplitude threshold $T_f$ used to calculate compensation energy.

FIG. 6 is a graph illustrating an amplitude threshold $T_f$ used to calculate compensation energy.

As shown in FIG. 6, the amplitude threshold is different with frequencies, and even a relatively small amplitude can be perceived by a human in the range of about $10^2$ to $10^3$ Hz, but only a relatively large amplitude can be perceived by a human outside the above range.

Figure 7:
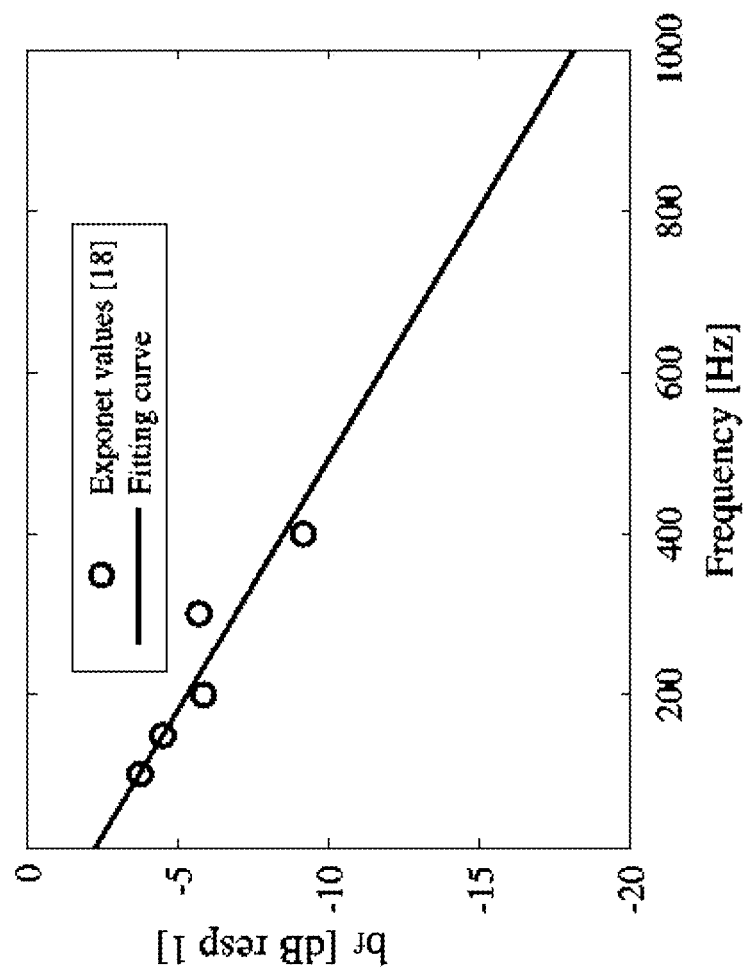
FIG. 7 is a graph representing an exponential threshold b used to calculate the compensation energy.

FIG. 7 is a graph representing of the exponential value $b_f$ used to calculate the compensation energy.

The exponential value $b_f$ of FIG. 7 is an example of using a value obtained by linearly interpolating an exponential value $b_f$ of 400 Hz or less, which has been conventionally reported.

Figure 8:
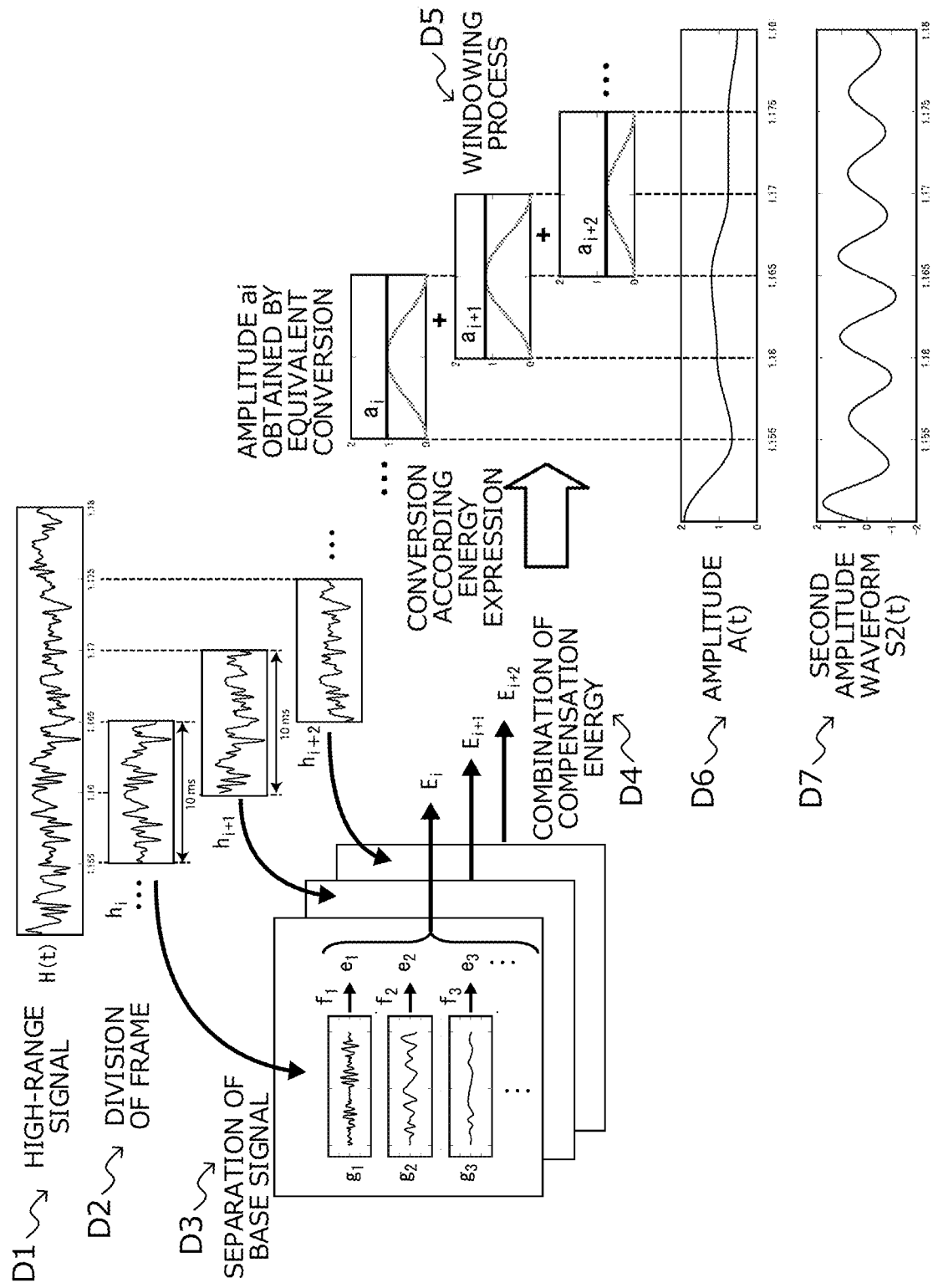
FIG. 8 is a diagram illustrating use of a window function in the vibration control apparatus shown in FIG. 1.

FIG. 8 is a diagram illustrating use of a window function in the vibration control apparatus 1 shown in FIG. 1.

As shown in reference number D1, a high-range signal H(t) is input. As shown in the reference number D2, the high-range signal H(t) is divided into frames as signals $h_i$, $h_{i+1}$, $h_{i+2}$, . . . for each frame i, i+1, i+2, . . . , respectively. As shown by the reference number D3, the signal h of each divided frame is separated into multiple basis signals $g_1$, $g_2$, $g_3$ . . . . As shown by the reference number D4, scalar values $E_i$, $E_{1+1}$, $E_{1+2}$, obtained by combining the compensation energy of all the basis signals $g_1$, $g_2$, $g_3$ are output on the basis of the frequencies $f_1$, $f_2$, $f_3$, . . . that the basis signals $g_1$, $g_2$, $g_3$, . . . have. As shown in the reference number D5, the scalar values $E_i$, $E_{i+1}$, $E_{i+2}$, . . . of the vibration energy calculated in respective frames i are converted into vibration waveform having an equivalent vibration energy but having respective different carrier frequencies, and a windowing process using the window function is performed on the amplitudes $a_i(t)$, $a_{i+1}(t)$ $a_{i+2}(t)$, . . . of the waveforms. As shown in reference number D6, the frame combination is performed for the first to N-th frames, and the amplitude A(t) of the vibration waveform is output. As shown in the reference number D7, a second vibration waveform $S_2(t)$ having a carrier frequency that makes the amplitude to be A(t) is outputted.

Figure 9:
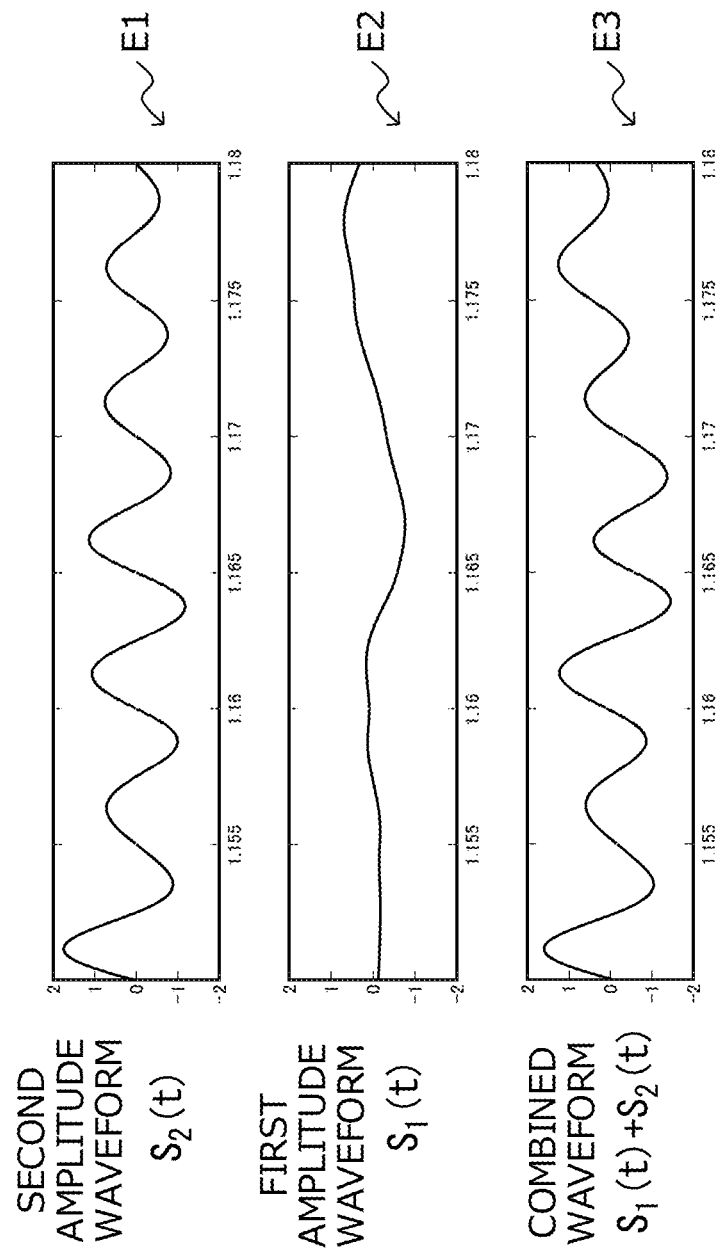
FIG. 9 is a graph illustrating an example of a combining a low frequency and a high frequency in the vibration control apparatus shown in FIG. 1.

FIG. 9 is a graph illustrating an example of a combining of a low frequency and a high frequency in the vibration control apparatus 1 shown in FIG. 1.

The second vibration waveform $S_2(t)$ generated from the high-range signal H(t) using the window function of FIG. 8 and indicated by the referenced number E1 is combined with a first vibration waveform $S_1(t)$ corresponding to the outputted low-range signal L(t) without any modification and indicated by the reference number E2. Thereby, the combined waveform $S_1(t)+S_2(t)$ represented by the reference number E3 is output.

Figure 10:
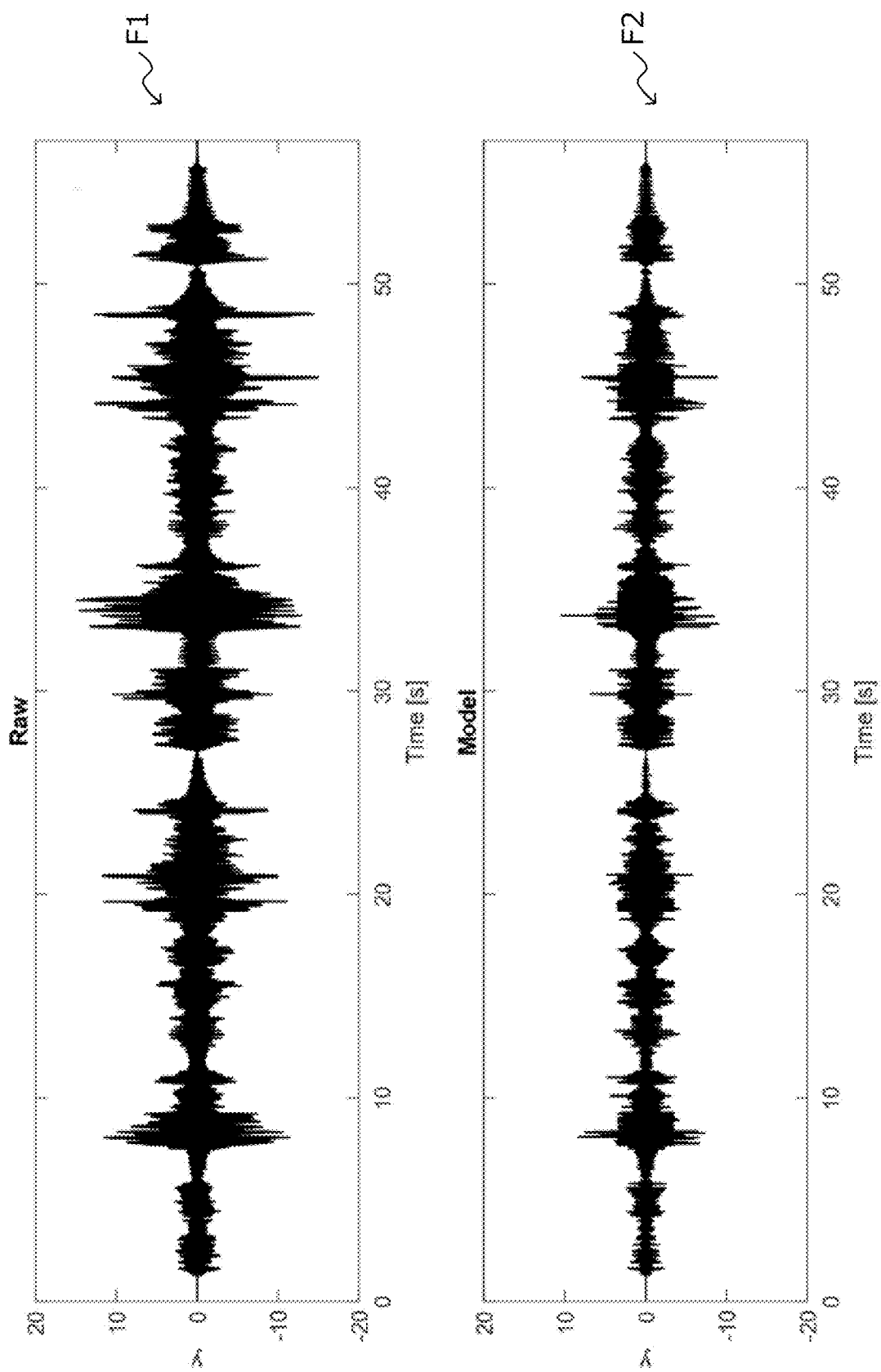
FIG. 10 is a graph showing a specific example of the waveform of the signal before and after the conversion by the vibration control apparatus shown in FIG. 1.

FIG. 10 is a graph showing a specific example of the waveform of the signal before and after the conversion by the vibration control apparatus 1 shown in FIG. 1.

In FIG. 10, the waveform before the conversion (see reference number F1) and the waveform after conversion (see reference number F2) of the sound of the violin are represented in the form of the amplitudes per time.

The sound of high-frequency vibration like violin generates a large amount of auditory noise in the conventional tactile vibration, and when the low-pass filter is applied, the vibration which the human can recognize disappears. For the above, the compensation energy is calculated so that the waveform becomes a waveform of a single wavelength having a carrier frequency of low frequency for each time.

Figure 11:
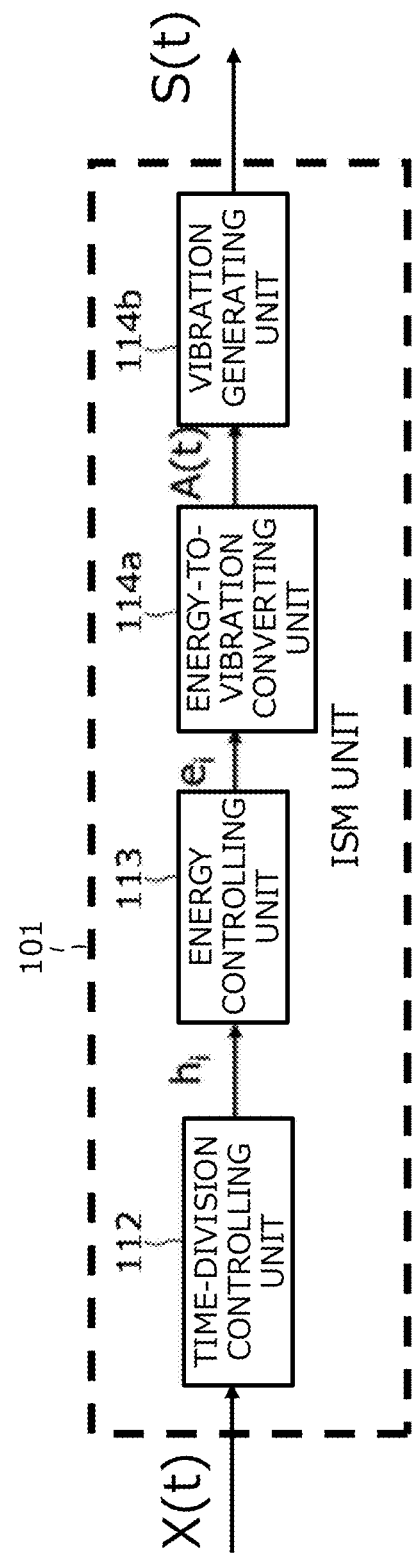
FIG. 11 is a block diagram illustrating an example of the functional configuration of an Intensity Segmentation Method (ISM) unit in the vibration control apparatus shown in FIG. 1.

FIG. 11 is a block diagram illustrating an example of the functional configuration of the ISM unit 101 in the vibration control apparatus shown in FIG. 1.

The ISM unit 101 functions as the time-division controlling unit 112, an energy controlling unit 113, the energy-to-vibration converting unit 114a, and a vibration generating unit 114b. In the present embodiment, the ISM unit 101 controls a vibration including the high-frequency component due to the high-frequency vibration 31 by using a signal. It is assumed that the high-frequency component of the signal X(t) is about 100 Hz or more, considering the human perception characteristic to vibration energy, but the high-frequency component may be converted into a low-frequency component less than 100 Hz. This makes it possible to emphasize the low-frequency component. The method of controlling a vibration on the basis of the time division of energy of the present disclosure is collectively referred to as ISM.

The time-division controlling unit 112 time-divides a vibration signal X(t) into N frames, and inputs the signal $h_i$ of the i-th time-divided frame into the energy controlling unit 113. The number N of frames may be determined by a predetermined cycle and an overlap rate of the windowing process.

The energy controlling unit 113 calculates the compensation energy $e_i$ for the signal $h_i$ of the i-th frame, and inputs the calculated compensation energy into the energy-to-vibration converting unit 114a.

The energy-to-vibration converting unit 114a generates a signal A(t) obtained by combining the respective compensation energy $e_1$ to $e_N$ of the first to N-th frames, and inputs the signal A(t) into the second vibration generating unit 114b.

The vibration generating unit 114b outputs, based on the synthesized signal A(t), a signal waveform S(t).

<B> Example of Operation

A first embodiment of the generating process of the vibration waveform in the vibration control apparatus 1 shown in FIG. 1 will now be described in accordance with a block diagram (Steps S1 to S7) shown in FIG. 12.

Figure 12:
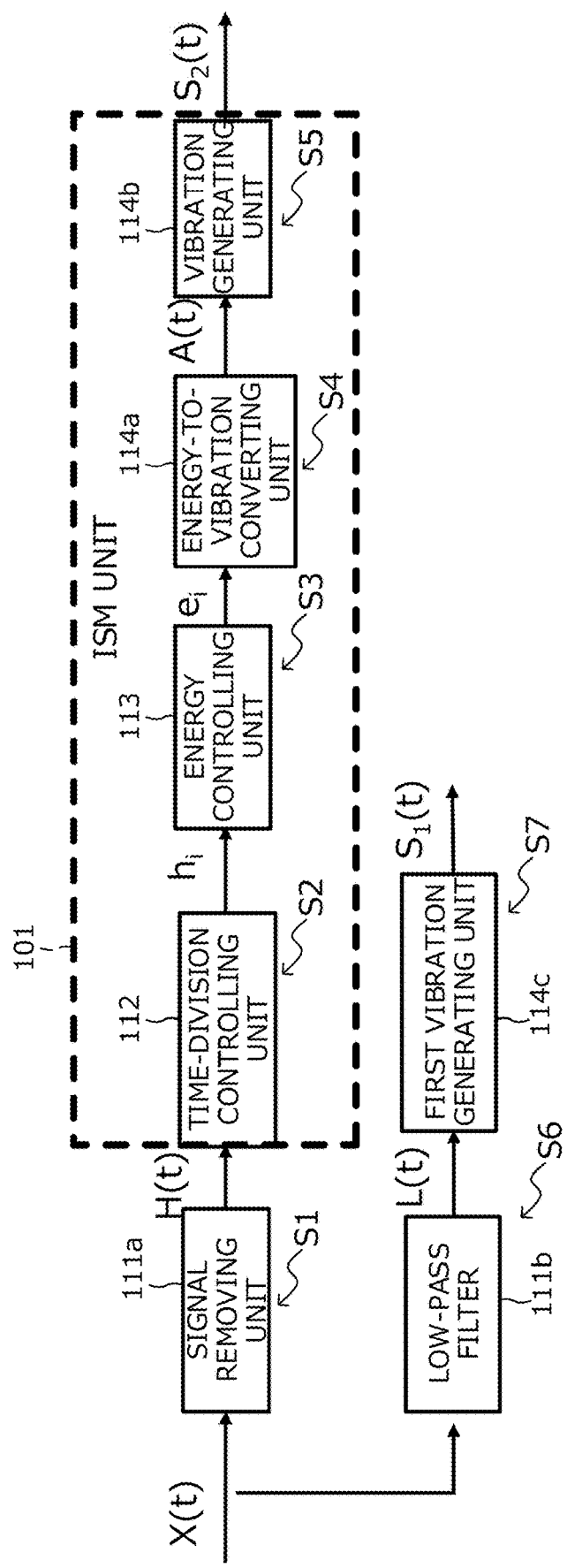
FIG. 12 is a block diagram illustrating a first embodiment of the generating process of a vibration waveform in the vibration control apparatus shown in FIG. 1.

A signal removing unit 111a and a low-pass filter 111b shown in FIG. 12 correspond to the frequency removing controlling unit 111 shown in FIG. 1. The energy-to-vibration converting unit 114a, the second vibration generating unit 114b, and the first vibration generating unit 114c shown in FIG. 12 correspond to the signal outputting unit 114 shown in FIG. 1.

The signal removing unit 111a generates a high-range signal H(t) by removing components of the predetermined frequency or less from the obtained signal X(t) before the conversion, and inputs the high-range signal H(t) into the time-division controlling unit 112 (Step S1).

The time-division controlling unit 112 time-divides the high-range signal H(t) into N frames, and inputs the signal $h_i$ of the i-th time-divided frame into the energy controlling unit 113 (Step S2). The number N of frames may be determined by a predetermined cycle and an overlap rate of the windowing process.

The energy controlling unit 113 calculates the compensation energy $e_i$ for the signal $h_i$ of the i-th frame, and inputs the calculated compensation energy into the energy-to-vibration converting unit 114a (Step S3).

The energy vibration converting unit 114a generates a signal A(t) obtained by combining the respective compensation energy $e_1$ to $e_N$ of the first to N-th frames, and inputs the signal A(t) into the second vibration generating unit 114b (Step S4).

The second vibration generating unit 114b outputs the second vibration waveform $S_2(t)$ based on the combined signal A(t) (Step S5).

On the other hand, the low-pass filter 111b inputs a low-range signal L(t), which is obtained by filtering components of the predetermined frequency or less from the obtained signal X(t) before the conversion, into the first vibration generating unit 114c (Step S6).

The first vibration generating unit 114c outputs a first vibration waveform $S_1(t)$ based on the low-range signal L(t) (Step S7).

Figure 13:
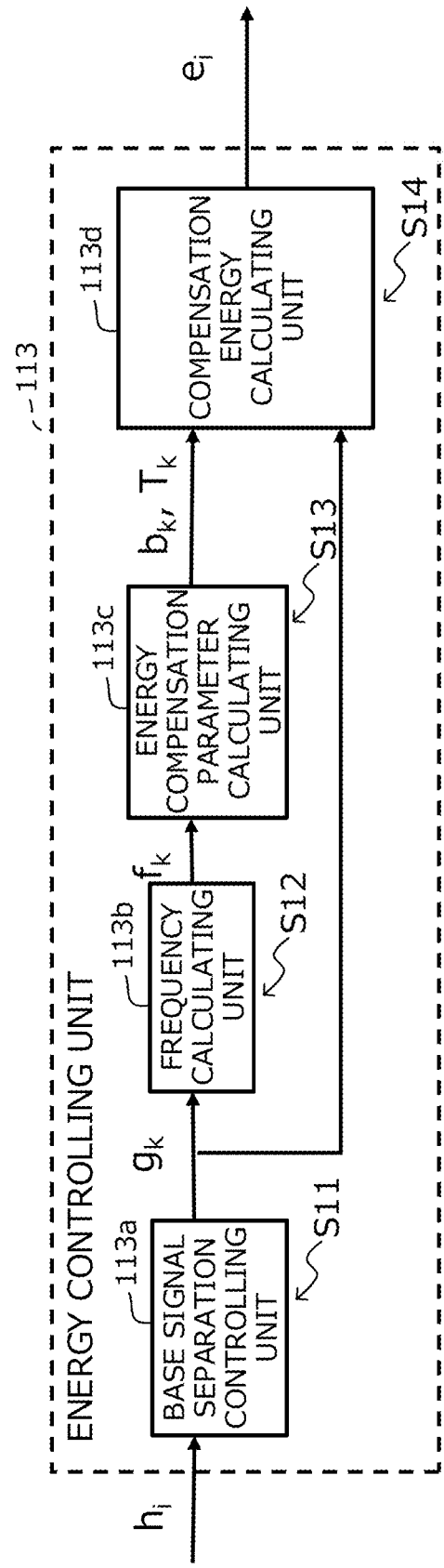
FIG. 13 is a block diagram illustrating details of an energy controlling process shown in FIG. 11.

Next, the energy controlling process shown in Step S3 of FIG. 12 will now be detailed in accordance with a block diagram (Steps S11 to S14) shown in FIG. 13.

As shown in FIG. 13, the energy controlling unit 113 functions as a basis signal separation controlling unit 113a, a frequency calculating unit 113b, an energy compensation parameter calculating unit 113c, and a compensation energy calculating unit 113d.

The basis signal separation controlling unit 113a separates multiple basis signals g from the signal $h_i$ of the time-divided i-th frame, which is the input signal, and inputs the basis signal k-th base signal $g_k$ into the frequency calculating unit 113b (Step S11). For example, signals may be separated by, for example, the short-time Fourier analysis, the wavelet analysis, the Empirical Mode Decomposition (EMD) method.

The frequency calculating unit 113b calculates the frequency $f_k$ of the k-th basis signal $g_k$ by, for example, discrete Fourier analysis or Hilbert Spectrum analysis, and inputs the calculated frequency $f_k$ into the energy compensation parameter calculating unit 113c (Step S12).

The energy compensation parameter calculating unit 113c calculates an exponent value $b_k$ and the amplitude threshold value $T_k$ described with reference to FIG. 6 based on the frequency $f_k$, and inputs the calculated exponent value $b_k$ and amplitude threshold value $T_k$ into the compensation energy calculating unit 113d (Step S13).

The compensation energy calculating unit 113d calculates the compensation energy $I_{pc}$ for each basis signal $g_k$ based on the exponent value $b_k$ and the amplitude threshold value $T_k$ in accordance with Expression 1, and outputs a scalar value $e_i$ obtained by summing the compensation energies of all the basis signals $g_k$ (Step S14).

Next, description will now be made in relation to an separating process of a low-frequency component in the energy controlling process shown in FIG. 11 as a second embodiment of the generating process of the vibration waveform in the vibration control apparatus 1 shown in FIG. 1 in accordance with a block diagram (Step S101 to S105) shown in FIG. 14.

Figure 14:
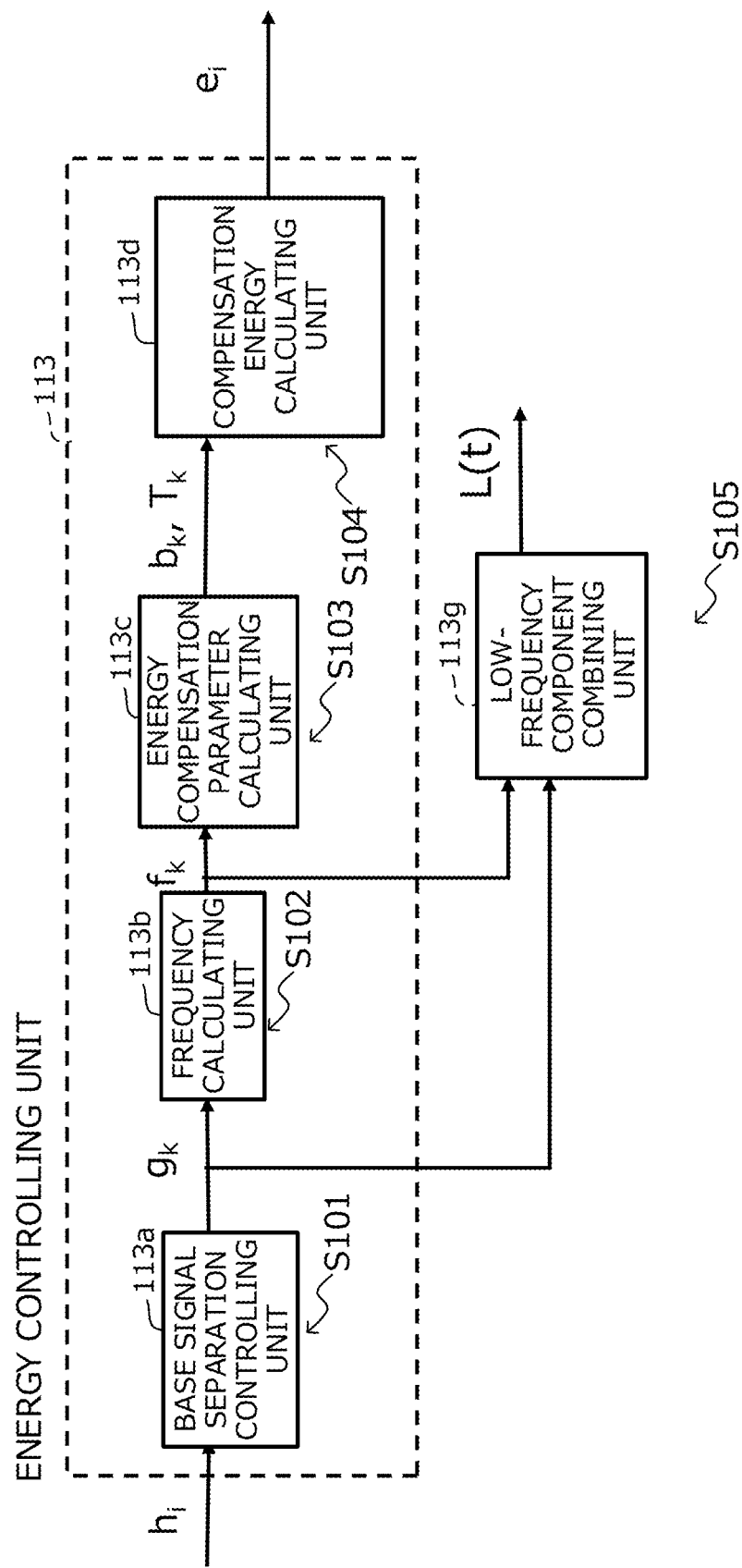
FIG. 14 is a block diagram illustrating an separating process of a low-frequency component in the energy controlling process shown in FIG. 11 as a second embodiment of the generating process of the vibration waveform in the vibration control apparatus shown in FIG. 1.

As shown in FIG. 14, the energy controlling unit 113 functions as a basis signal separation controlling unit 113a, a frequency calculating unit 113b, an energy compensation parameter calculating unit 113c, and a compensation energy calculating unit 113d, and may also have a function of separating a low-frequency component to a low-frequency component combining unit 113g.

The basis signal separation controlling unit 113a separates multiple basis signals g from the signal $h_i$ of the time-divided i-th frame, which is the input signal, and inputs the separated k-th basis signals $g_k$ into the frequency calculating unit 113b (Step S101). For example, signals may be separated by, for example, the short-time Fourier analysis, the wavelet analysis, the EMD method.

The frequency calculating unit 113b calculates the frequency $f_k$ of the k-th basis signal $g_k$ by, for example, discrete Fourier analysis or Hilbert Spectrum analysis, and inputs the calculated frequency $f_k$ into the energy compensation parameter calculating unit 113c (Step S102).

The energy compensation parameter calculating unit 113c calculates an exponent value $b_k$ and the amplitude threshold value $T_k$ described with reference to FIG. 6 based on the frequency $f_k$, and inputs the calculated exponent value $b_k$ and amplitude threshold value $T_k$ to the compensation energy calculating unit 113d (Step S103).

The compensation energy calculating unit 113d calculates the compensation energy $I_{pc}$ for each basis signal $g_k$ based on the exponent value $b_k$ and the amplitude threshold value $T_k$ in accordance with Expression 1, and outputs a scalar value $e_i$ obtained by summing the compensation energies of all the basis signals $g_k$ (Step S104).

The low-frequency component combining unit 113g generates a low-frequency component L(t) by combining basis signals $g_k$ each having a frequency $f_k$ smaller than the predetermined frequency (Step S105).

A sound source including signals of multiple frequency bands is sometimes desired to be presented as a vibration by emphasizing vibration energy of a particular frequency band. Description will now be made in relation to energy controlling units 1131 and 1132 serving as modifications applied when a waveform is converted by adjusting the energy of a basis signal present in a predetermined frequency band with reference to FIGS. 15A to 20.

Figures 15A, 15B, 15C:
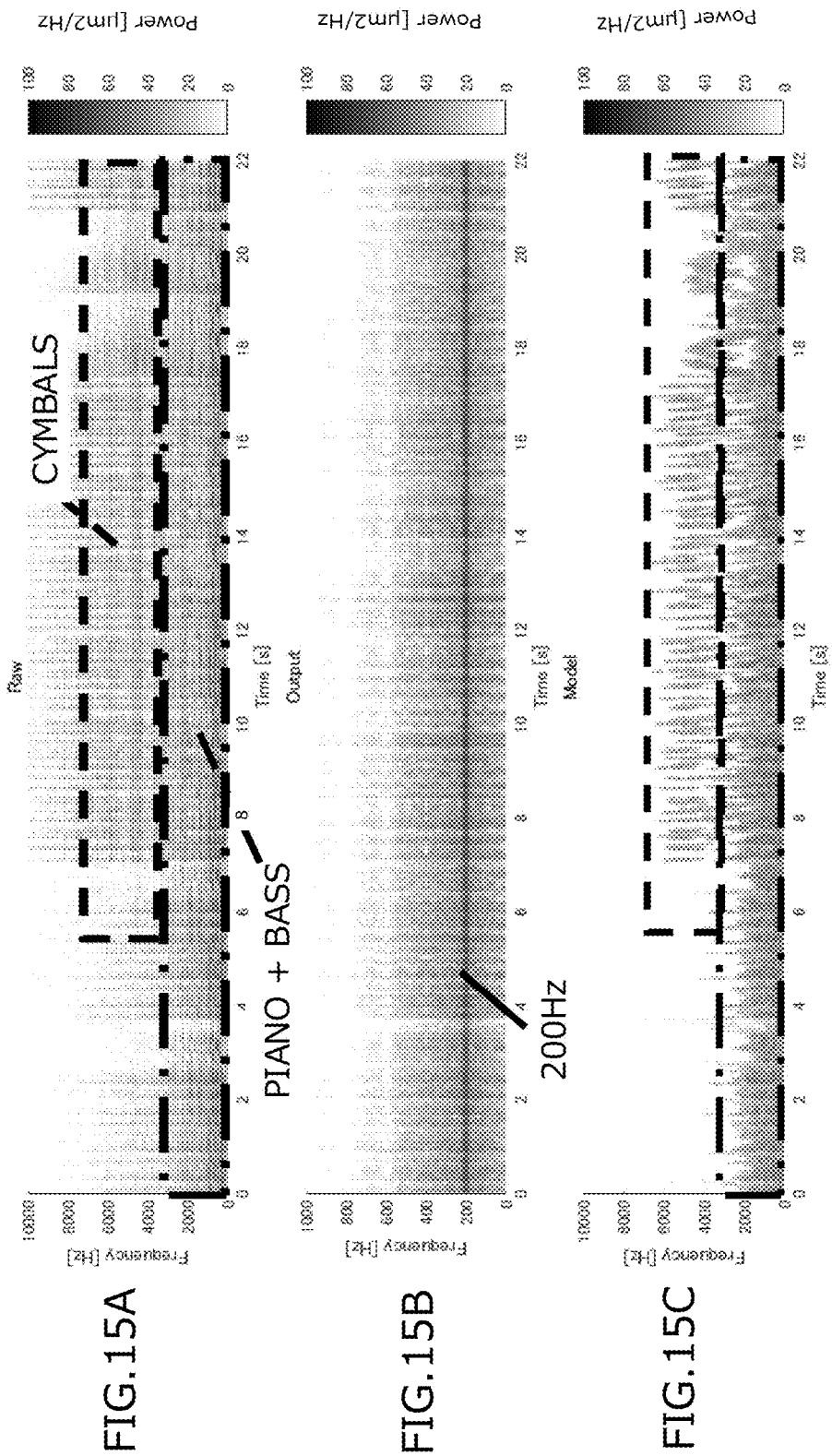
FIG. 15A, FIG. 15B and FIG. 15C are graphs illustrating an example of generating a vibration according to ISM without emphasizing the waveform.

FIG. 15A, FIG. 15B and FIG. 15C are graphs illustrating an example of generating a vibration according to ISM without emphasizing the waveform. In FIG. 15A, FIG. 15B and FIG. 15C, a band corresponding to the waveform of the cymbals (drum) of a high-frequency component from the music of the piano trio and the band corresponding to the waveform of the piano and the bass are shown. In FIG. 15A, FIG. 15B and FIG. 15C, the horizontal axis indicates time [s], the vertical axis indicates frequency [Hz], a dense spectrum has large power, and a thin spectrum has small power.

FIG. 15A shows, as a distribution of a sound source spectrum, a waveform of the cymbals serving as a high-frequency component shown by a broken line and a waveform of the piano and the bass of a low-frequency component shown by a chain line.

FIG. 15B shows a spectral distribution (centering at 200 Hz) when the waveform is converted by the ISM. FIG. 15B extracts all the cymbals, the piano, and the bass as intensities due to the effect of ISM.

FIG. 15C shows an example in which the waveform is converted into a signal by using the representative frequency of the basis signal, without converting to a signal having a frequency of 200 Hz based on the intensity. This visualizes which frequency band was emphasized.

FIG. 16A, FIG. 16B and FIG. 16C are graphs illustrating a first example in which a high-frequency component is emphasized in and separated from the sound source. FIG. 16A, FIG. 16B and FIG. 16C show an example in which cymbals (drum) of a high-frequency component is emphasized and separated from music of a piano trio. In FIG. 16A, FIG. 16B and FIG. 16C, the horizontal axis indicates time [s], the vertical axis indicates frequency [Hz], a dense spectrum has large power, and a thin spectrum has small power.

FIG. 16A shows, as a distribution of a sound source spectrum, a waveform of the cymbals serving as a high-frequency component shown by a broken line and a waveform of the piano and the bass of a low-frequency component shown by a chain line.

FIG. 16B shows a spectral distribution (centering at 200 Hz) when the waveform is converted by the ISM. In FIG. 16B, only the intensity of 3000 Hz or more is emphasized by +20 dB (100 times).

FIG. 16C shows an example in which the waveform is converted into a signal by using the representative frequency of the basis signal, without converting to a signal having a frequency of 200 Hz based on the intensity. This visualizes which frequency band was emphasized. In FIG. 16C, the power of the spectrum of the cymbals is increased.

Figure 17A:
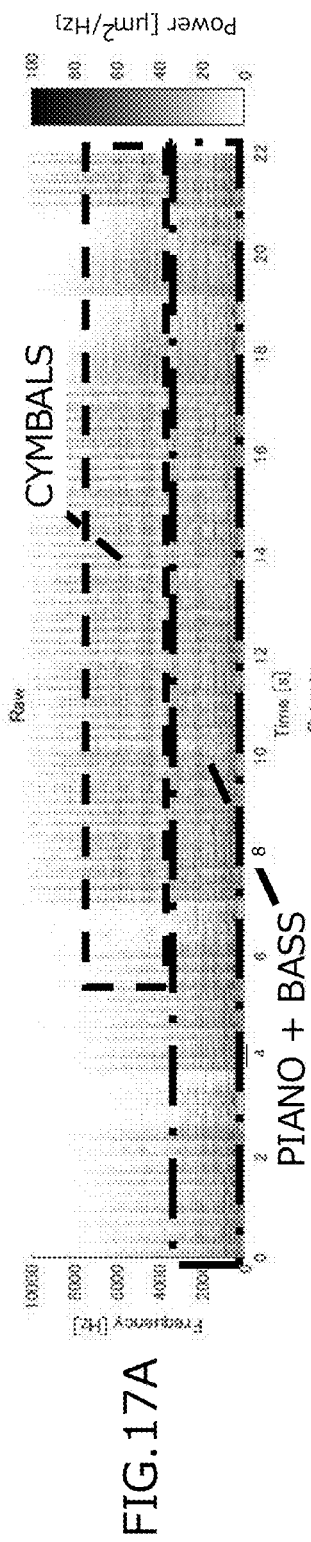
FIG. 17A, FIG. 17B and FIG. 17C are graphs illustrating a second example of emphasizing and separating a high-frequency component of 3000 Hz or more from a sound source.
Figure 17B:
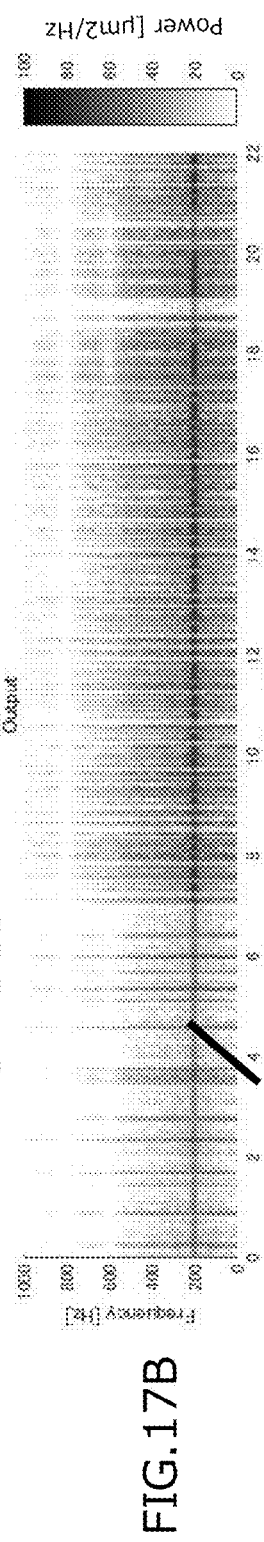
Figure 17C:
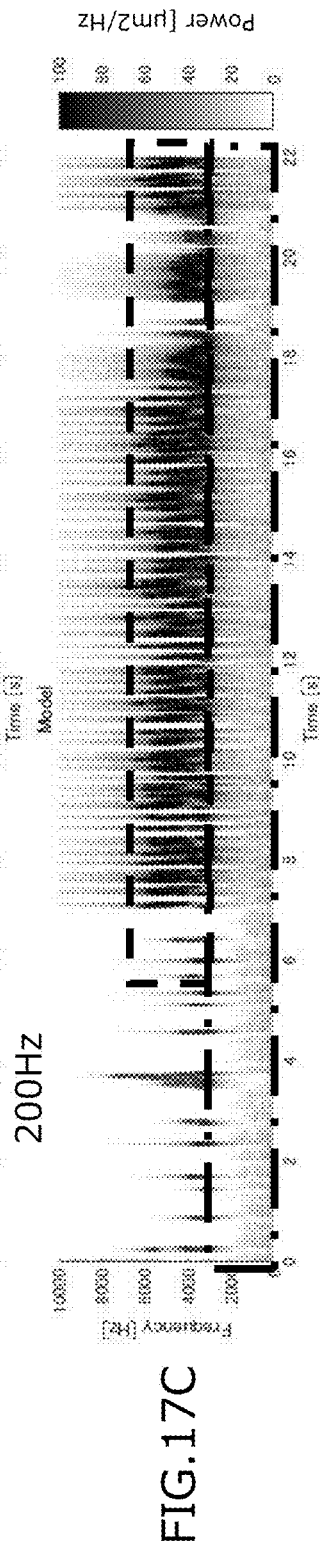

FIG. 17A, FIG. 17B and FIG. 17C are graphs illustrating a second example in which a high-frequency component is emphasized in and separated from the sound source. FIG. 17A, FIG. 17B and FIG. 17C show an example in which cymbals (drum) of a high-frequency component is emphasized in and separated from music of a piano trio. In FIG. 17A, FIG. 17B and FIG. 17C, the horizontal axis indicates time [s], the vertical axis indicates frequency [Hz], a dense spectrum has large power, and a thin spectrum has small power.

FIG. 17A shows, as a distribution of a sound source spectrum, a waveform of the cymbals serving as a high-frequency component shown by a broken line and a waveform of the piano and the bass of a low-frequency component shown by a chain line.

FIG. 17B shows a spectral distribution (centering at 200 Hz) when the waveform is converted by the ISM. In FIG. 17B, the intensity of 3000 Hz or more is emphasized by +20 dB (100 times), while the intensity of 1000 Hz or less is emphasized by −10 dB (1/10 times).

FIG. 17C shows an example in which the waveform is converted into a signal by using the representative frequency of the basis signal, without converting to a signal having a frequency of 200 Hz based on the intensity. This visualizes which frequency band was emphasized. In FIG. 17C, the power of the spectrum of the cymbals is increased.

FIG. 18A, FIG. 18B and FIG. 18C are graphs illustrating an example in which a low-frequency component emphasized in and separated from a sound source. FIG. 18A, FIG. 18B and FIG. 18C show an example in which the piano and the bass of the low-frequency component is emphasized and separated from the music of a piano trio. In FIG. 18A, FIG. 18B and FIG. 18C, the horizontal axis indicates time [s], the vertical axis indicates frequency [Hz], a dense spectrum has large power, and a thin spectrum has small power.

FIG. 18A shows, as a distribution of a sound source spectrum, a waveform of the cymbals serving as a high-frequency component shown by a broken line and a waveform of the piano and the bass of a low-frequency component shown by a chain line.

FIG. 18B shows a spectral distribution (centering at 200 Hz) when the waveform is converted by the ISM. In FIG. 18B, the intensity of 1000 Hz or less is emphasized by +10 dB (10 times).

FIG. 18C shows an example in which the waveform is converted into a signal by using the representative frequency of the basis signal, without converting to a signal having a frequency of 200 Hz based on the intensity. This visualizes which frequency band was emphasized. In FIG. 18C, the power of the spectrum of the piano and the base is increased.

A first modification of the energy controlling process illustrated in FIG. 11 will be described in accordance with a block diagram (Steps S41 to S45) illustrated in FIG. 19.

Figure 19:
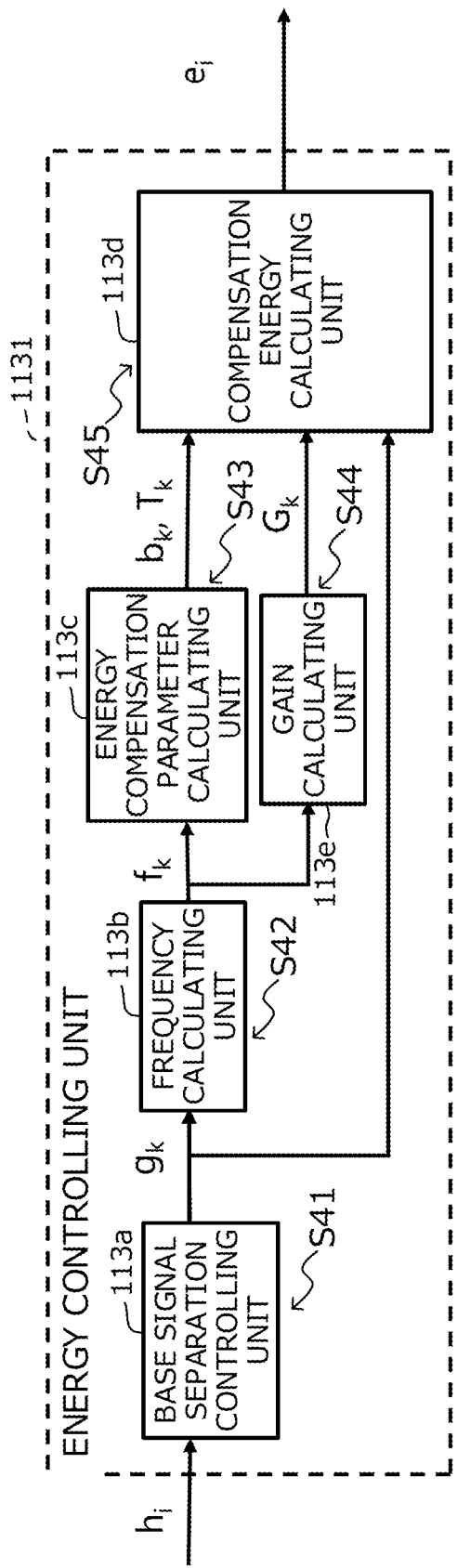
FIG. 19 is a block diagram illustrating a first modification of the energy controlling process shown in FIG. 11.

As shown in FIG. 19, the energy controlling unit 1131 functions as a gain calculating unit 113e in addition to the basis signal separation controlling unit 113a, the frequency calculating unit 113b, the energy compensation parameter calculating unit 113c, and the compensation energy calculating unit 113d shown in FIG. 13.

The basis signal separation controlling unit 113a separates multiple basis signals g from the signal $h_i$ of the time-divided i-th frame, which is the input signal, and inputs the separated k-th basis signal $g_k$ into the frequency calculating unit 113b (Step S41). For example, signals may be separated by, for example, the short-time Fourier analysis, the wavelet analysis, the EMD method.

The frequency calculating unit 113b calculates the frequency $f_k$ of the k-th basis signal $g_k$ by, for example, discrete Fourier analysis or Hilbert Spectrum analysis, and inputs the calculated frequency $f_k$ into the energy compensation parameter calculating unit 113c (Step S42).

The energy compensation parameter calculating unit 113c calculates an exponent value $b_k$ and the amplitude threshold value $T_k$ described with reference to FIG. 6 based on the frequency $f_k$, and inputs the calculated exponent value $b_k$ and amplitude threshold value $T_k$ to the compensation energy calculating unit 113d (Step S43).

The gain calculating unit 113e outputs gain values $G_k$ predetermined for respective frequency bands in accordance with the calculated frequency $f_k$ of the basis signals $g_k$ (Step S44). If the energy is to be emphasized, the gain is set to $G_k>1$, and if the energy is to be suppressed, the gain is set to $0 \leq G_k<1$. The adjustment of the energy by emphasizing or suppressing may be performed on a single frequency band or on multiple frequency bands. Further alternatively, the adjustment of the energy may be performed on the entire frequency band input into the energy controlling unit 1131.

The compensation energy calculating unit 113d calculates compensation energy $I_{pc}$ adjusted with a gain using the following Expression 2 for the amplitude A of the separated basis signal $g_k$, and outputs a scalar value $e_i$ obtained by summing compensation energy of all the basis signals $g_k$ (Step S45).

$$I_{pc} = G\left(\frac{A^2}{T_f^2}\right)^{b_f}$$ [Expression 2]

A second modification of the energy controlling process illustrated in FIG. 11 will be described in accordance with a block diagram (Steps S51 to S55) illustrated in FIG. 20.

Figure 20:
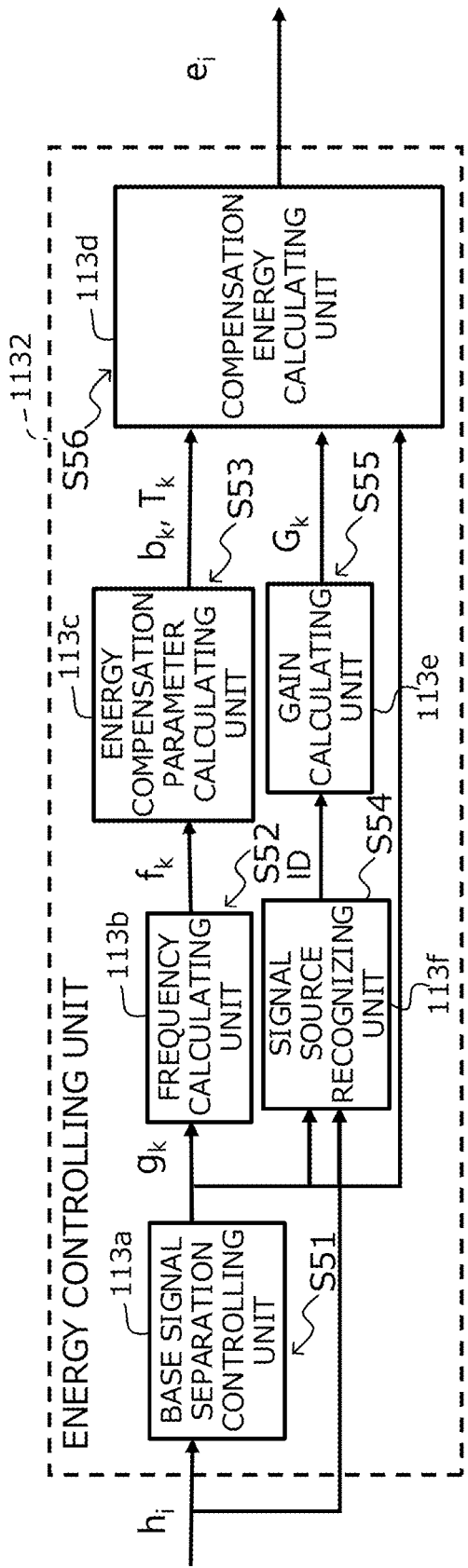
FIG. 20 is a block diagram illustrating a second modification of the energy controlling process shown in FIG. 11.

As shown in FIG. 20, the energy controlling unit 1132 functions as a gain calculating unit 113e and a signal source recognizing unit 113f in addition to the basis signal separation controlling unit 113a, the frequency calculating unit 113b, the energy compensation parameter calculating unit 113c, and the compensation energy calculating unit 113d shown in FIG. 13.

The basis signal separation controlling unit 113a basis signals multiple basis signals g from the signal $h_i$ of the time-divided i-th frame, which is the input signal, and inputs the basis signaled k-th basis signal $g_k$ into the frequency calculating unit 113b (Step S51). For example, signals may be basis signaled by, for example, the short-time Fourier analysis, the wavelet analysis, the EMD method.

The frequency calculating unit 113b calculates the frequency $f_k$ of the k-th basis signal $g_k$ by, for example, discrete Fourier analysis or Hilbert Spectrum analysis, and inputs the calculated frequency $f_k$ into the energy compensation parameter calculating unit 113c (Step S52).

The energy compensation parameter calculating unit 113c calculates an exponent value $b_k$ and the amplitude threshold value $T_k$ described with reference to FIG. 6 based on the frequency $f_k$, and inputs the calculated exponent value $b_k$ and amplitude threshold value $T_k$ to the compensation energy calculating unit 113d (Step S53).

The signal source recognizing unit 113f estimates a recognition candidate from, for example, the inputted signals $h_i$ and the history of $h_i$ on the basis of the set signal characteristics, and recognizes a signal source that the basis signal $g_k$ belongs to, and outputs the results of the recognition in the form of ID (identifier) or the like (Step S54). The signal source recognizing unit 113f may prepare a recognizer in advance by machine learning or the like. For example, the characteristics of many instruments are learned by deep learning, and the candidates (e.g., piano, bass, drum) for which instruments are included in the present input signal $h_i$ (or, if the input signal $h_i$ is too short, the history of each of multiple input signals $h_i$) may be estimated, and the instrument that the basis signal $g_k$ pertains to may be identified.

The gain calculating unit 113e outputs gain values $G_k$ for respective predetermined frequency bands in accordance with the IDs specified by the signal source recognizing unit 113f (Step S55). If the energy is to be emphasized, the gain is set to $G_k>1$, and if the energy is to be suppressed, the gain is set to $0 \leq G_k<1$. The adjustment of the energy by emphasizing or suppressing may be performed on a single frequency band or on multiple frequency bands. Further alternatively, the adjustment of the energy may be performed on the entire frequency band input into the energy controlling unit 1132.

The compensation energy calculating unit 113d calculates compensation energy $I_{pc}$ adjusted with a gain using Expression 2 for the amplitude A of the basis signaled basis signal $g_k$, and outputs a scalar value $e_i$ obtained by summing compensation energy of all the basis signals $g_k$ (Step S56).

Next, an energy combining process shown in Step S4 of FIG. 11 will be detailed with reference to a block diagram (Steps S21 to S23) shown in FIG. 21.

An energy-to-vibration converting unit 114a functions as an energy equivalent converting unit 1141a, a windowing processing unit 1142a, and a frame combining unit 1143a.

Figure 21:
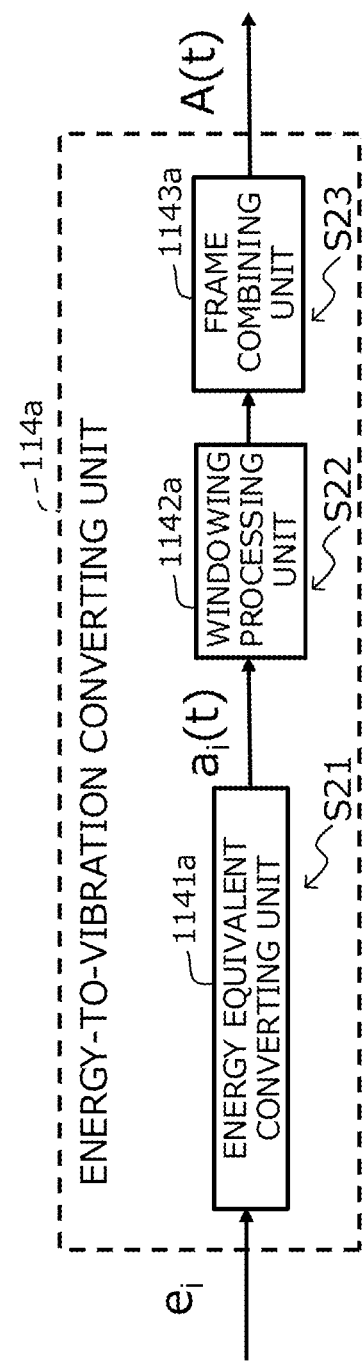
FIG. 21 is a block diagram illustrating details of an energy combining process shown in FIG. 11.

As shown in FIG. 21, the energy equivalent converting unit 1141a converts the scalar values $e_i$ of the vibration energy calculated in respective frames i into vibration waveforms having the same vibration energy but different carrier frequencies, and outputs the amplitudes $a_i(t)$ of the waveforms to the windowing processing unit 1142a (Step S21).

The windowing processing unit 1142a performs a windowing processing using the window function of FIG. 8 on the amplitudes $a_i(t)$ of the respective input frames i, and inputs the processing result to the frame combining unit 1143a (Step S22).

The frame combining unit 1143a performs frame combining on the input from the windowing processing unit 1142a for the first to N-th frames, and outputs the amplitude A(t) of the vibration waveform (step S23).

Next, the details of a generating process of the compensated vibration waveform shown in Step S5 of FIG. 11 will be described in accordance with a block diagram (Steps S31 and S32) shown in FIG. 22.

Figure 22:
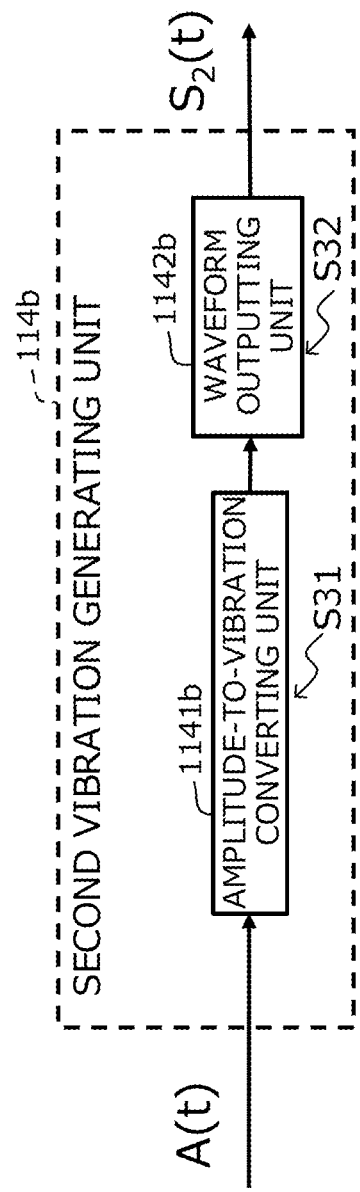
FIG. 22 is a block diagram illustrating the details of a generating process of a compensated vibration waveform shown in FIG. 11.

As shown in FIG. 22, the second vibration generating unit 114b functions as an amplitude-to-vibration converting unit 1141b and a waveform outputting unit 1142b. The second vibration generating unit 114b has an input signal A(t) and outputs a sine wave having a carrier frequency. The phase of the generated waveform may be controlled such that the vibration is smoothly connected.

The amplitude-to-vibration converting unit 1141b converts the input amplitude A(t) into a vibration (Step S31).

The waveform outputting unit 1142b outputs the sine wave $S_2(t)$ having the carrier frequency so that the amplitude becomes A(t) (Step S32).

<C> Effect

According to the vibration control apparatus 1, the signal control program, and a vibration control method according to the example of the embodiment can bring the following effects and advantages, for example.

The time-division controlling unit 112 divides a signal for controlling a vibration by the vibration apparatus at intervals of a predetermined time. The energy controlling unit 1131 and 1132 each convert the waveform of the second signal component at every predetermined time divided by the time-division controlling unit 112. The energy controlling unit 1131 and 1132 each convert the waveform of a signal having a specific frequency band by adjusting the energy of the signal, and convert the waveform of a signal having a frequency band except for the specific frequency band while maintaining the energy of the signal. Further, the energy control units 1131 and 1132 may each convert the waveform of a signal, which is extracted on the basis of a particular feature value, by adjusting the energy the signal, and convert the waveform of a signal, which is not extracted on the basis of the particular feature value, into a waveform having a frequency band different from the frequency of the signal while maintaining energy of the signal. This can generate a vibration of the high-frequency band that is easy to perceive by human, and also a vibration corresponding to an arbitrary signal source can be emphasized or suppressed and then output. Accordingly, the energy can be adjusted according to the sensitivity and preference to a vibration of the individual person. In addition, the generation of auditory noise generated by the vibration of a high frequency band can be suppressed.

The energy controlling unit 1131 and 1132 each adjust energy of a signal of the specific frequency band by multiplying the energy and a gain value determined according to the specific frequency band. This makes it possible to emphasize and suppress a vibration corresponding to an arbitrary signal source with ease.

The gain value may be determined based on another feature of the signal, such as ID, as well as the frequency. This facilitates the emphasis or suppression of a vibration corresponding to a particular signal source.

The time-division controlling unit 112 divides the component of the signal at the intervals having a lower limit of 80 Hz. This makes it possible to efficiently extract a signal component of a high-frequency band which is a conversion target.

The signal outputting unit 114 outputs, for a signal included in a vibration and having a frequency equal to or less than a predetermined frequency, a first signal component that does not undergo the waveform conversion by the energy controlling unit 1131 or 1132 and a second signal component that undergoes the waveform conversion by the energy controlling unit 1131 or 1132. Accordingly, the signal component of the low frequency band that is not the conversion target can be output to the vibration apparatus without being modified.

The predetermined frequency separating the first signal component and the second signal component ranges from 80 Hz to 400 Hz. Thereby, it is possible to appropriately convert the waveform of the high-frequency component.

For the first signal component output by the signal outputting unit 114, the vibration thereof is generated by the low-frequency vibration 32 among the multiple vibration apparatuses. For the second signal component output by the signal outputting unit 114, the vibration thereof is generated by the high-frequency vibration 31 among the multiple vibration apparatuses. This makes it possible to cause a person to realistically feel a vibration of the high frequency band and a vibration of the low frequency band. The low-frequency vibration 32 may be omitted in the vibration generating system 100. In that case, a vibration due to signal components below a predetermined frequency may be generated from the high-frequency vibration 31, or a vibration due to signal components below the predetermined frequency do not have to be generated in the vibration generating system 100.

<D> Miscellaneous

The disclosed technologies are not limited to the respective embodiments described above, and may be variously modified without departing from the scope of the embodiments. The respective configurations and processes of the respective embodiments can be selected, omitted, and combined according to the requirements.

The vibration generating system 100 illustrated in FIG. 1 includes the high-frequency vibration 31 and the low-frequency vibration 32, but is not limited this. The number of vibrations provided in the vibration generating system 100 may be varied.

Figure 23:
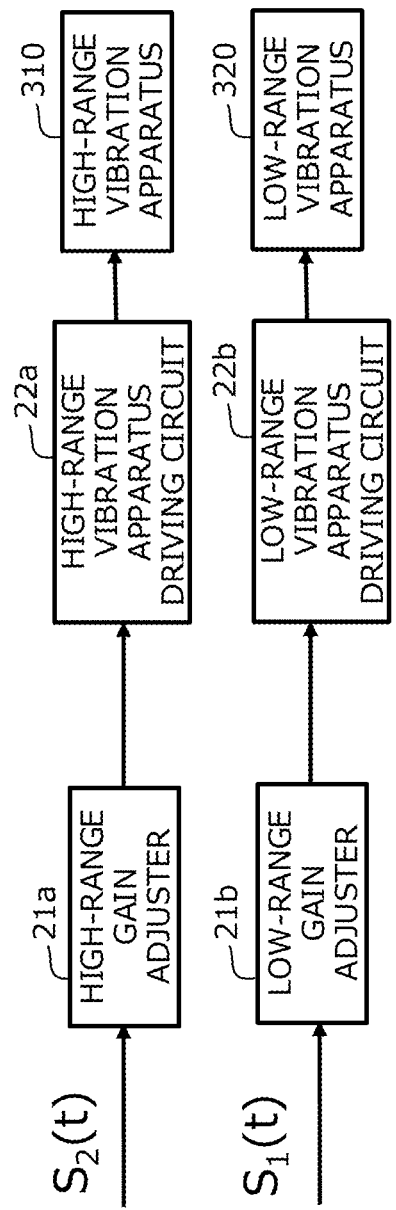
FIG. 23 is a block diagram illustrating an example of the configuration of a DAC when the vibration generating system shown in FIG. 1 uses multiple vibration apparatuses.

FIG. 23 is a block diagram illustrating an example of the configuration of a DAC 2 for the vibration generating system 100 of FIG. 1 which uses multiple vibration apparatuses 310 and 320.

In the example shown in FIG. 23, the DAC 2 shown in FIG. 1 functions as a high-range gain adjuster 21a, a low-range gain adjuster 21b, a high-range vibration apparatus driving circuit 22a, and a low-range vibration apparatus driving circuit 22b. In addition, the high-frequency vibration 31 and the low-frequency vibration 32 shown in FIG. 1 function as the high-frequency vibration apparatus 310 and the low-frequency vibration apparatus 320, respectively.

The high-frequency gain adjuster 21a outputs a second vibration waveform $S_2(t)$ inputted from the vibration control apparatus 1 to the high-range vibration apparatus 310 via a high-range vibration apparatus driving circuit 22a.

The low-range gain adjuster 21b outputs the first vibration waveform $S_1(t)$ inputted from the vibration control apparatus 1 to the low-range vibration apparatus 320 via the low-range vibration apparatus driving circuit 22b.

Figure 24:
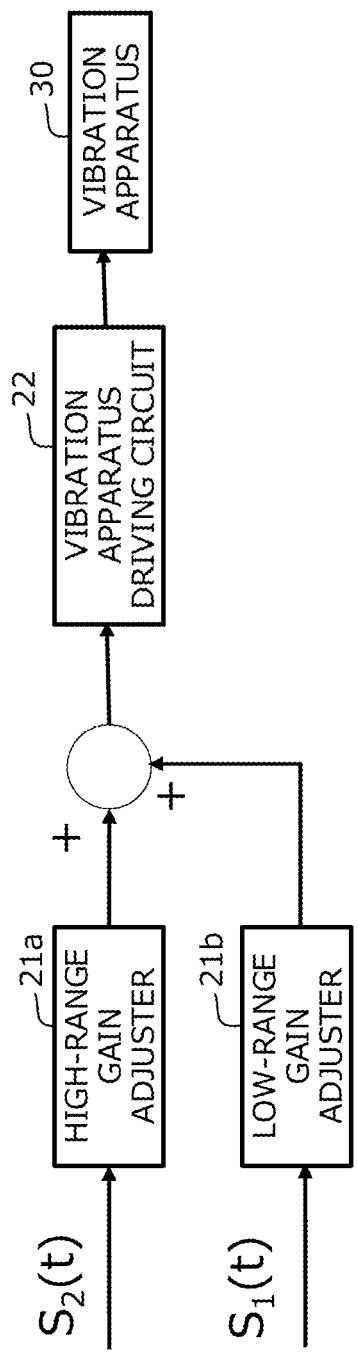
FIG. 24 is a block diagram showing an example of the configuration of the DAC when the vibration generating system shown in FIG. 1 uses a single vibration apparatus.

FIG. 24 is a block diagram showing a configuration example of a DAC when using a single vibration apparatus in the vibration generating system 100 shown in FIG. 1.

In the example shown in FIG. 24, the DAC 2 shown in FIG. 1 functions as a high-range gain adjuster 21a, a low-range gain adjuster 21b, and a vibration apparatus driving circuit 22. In addition, the high-frequency vibration 31 and the low-frequency vibration 32 shown in FIG. 1 function as a vibration apparatus 30.

The high-range gain adjuster 21a and the low-range gain adjuster 21b respectively output a second vibration waveform $S_2(t)$ and a first vibration waveform $S_1(t)$, which are input from the vibration control apparatus 1, to the common vibration apparatus 30 via the common vibration apparatus driving circuit 22.

What is claimed is:

1. A vibration control apparatus configured to control a vibration generated by a vibration apparatus, using a signal, the vibration controlling apparatus comprising:
   processor circuitry; and
   an energy controller configured to convert a waveform of the signal while maintaining energy of the signal and to convert the waveform of the signal into a waveform having a frequency band different from a frequency of the signal; and
   a time-division controller configured to divide a component of the signal at intervals of a predetermined time, wherein
   the energy controller is configured to convert the waveform of the signal in a unit of the predetermined time divided by the time-division controller.

2. A vibration control apparatus configured to control a vibration generated by a vibration apparatus, using a signal, the vibration control apparatus comprising:
   a time-division controller configured to divide the signal at intervals of a predetermined time; and
   an energy controller configured to convert a waveform of the signal in a unit of the predetermined time divided by the time division controller, wherein
   the energy controller is configured to convert the waveform of a signal having a specific frequency band among frequency components of the signal by adjusting energy of the signal, and converts the waveform of a signal having a frequency band except for the specific frequency into a waveform having a frequency band different from the frequency of the signal while maintaining energy of the signal.

3. A vibration control apparatus configured to control a vibration generated by a vibration apparatus, using a signal, the vibration control apparatus comprising:
   a time-division controller configured to divide the signal at intervals of a predetermined time; and
   an energy controller configured to convert a waveform of the signal in a unit of the predetermined time divided by the time division controller, wherein
   the energy controller is configured to convert the waveform of a signal, extracted on the basis of a particular feature value, by adjusting energy the signal, and converts the waveform of a signal, not extracted on the basis of the particular feature value, into a waveform having a frequency band different from the frequency of the signal while maintaining energy of the signal.

4. The vibration control apparatus according to claim 2, wherein the energy controller is configured to adjust the energy by multiplying a gain value determined according to the specific frequency band and an energy of a signal in the specific frequency band.

5. The vibration control apparatus according to claim 4, wherein the gain value is determined according to an identifier determined for each of a plurality of the specific frequency bands.

6. The vibration control apparatus according to claim 1, wherein the time-division controller is configured to divide the component of the signal at a cycle having a lower limit of 80 Hz.

7. The vibration control apparatus according to claim 1, further comprising
   a frequency removing controller configured to remove a first signal component having a frequency equal to or less than a predetermined frequency from the signal, wherein
   the energy controller is configured to convert the waveform of a second signal component of the signal, the second signal component excluding the first component removed by the frequency removing controller.

8. The vibration control apparatus according to claim 7, further comprising signal outputting processor circuitry configured to output the first signal component that does not undergo conversion of the waveform by the energy controller and the second signal component that undergoes the conversion of the waveform by the energy controller.

9. The vibration control apparatus according to claim 7, wherein the predetermined frequency separating the first signal component from the second signal component ranges from 80 Hz to 400 Hz.

10. The vibration control apparatus according to claim 8, wherein:
    a vibration of the first signal component output by the signal outputting processor circuitry is generated by a first vibration apparatus among a plurality of the vibration apparatuses; and
    a vibration of the second signal component output by the signal outputting processor circuitry is generated by a second vibration apparatus among the plurality of the vibration apparatuses.

11. A non-transitory computer-readable storage medium having stored therein a vibration control program for controlling a vibration that, when executed by a computer that controls a vibration generated by a vibration apparatus, causes the computer to execute a process comprising:
    converting a waveform of the signal while maintaining energy of the signal and converting the waveform of the signal into a waveform having a frequency band different from a frequency of the signal; and
    dividing a component of the signal at intervals of a predetermined time, wherein
    the converting is configured to convert the waveform of the signal in a unit of the predetermined time.

12. A non-transitory computer-readable storage medium having stored therein a vibration control program for controlling a vibration that, when executed by a computer that controls a vibration generated by a vibration apparatus, causes the computer to execute a process comprising:
    dividing the signal at intervals of a predetermined time; and
    converting the waveform of the signal in a unit of the divided predetermined time, wherein
    the converting converts the waveform of a signal having a specific frequency band among frequency components of the signal by adjusting energy of the signal, and converts the waveform of a signal having a frequency band except for the specific frequency into a waveform having a frequency band different from the frequency of the signal while maintaining energy of the signal.

13. A non-transitory computer-readable storage medium having stored therein a vibration control program for controlling a vibration that, when executed by a computer that controls a vibration generated by a vibration apparatus, causes the computer to execute a process comprising:
    dividing the signal at intervals of a predetermined time; and
    converting the waveform of the signal in a unit of the divided predetermined time, wherein
    the converting converts the waveform of a signal, extracted on the basis of a particular feature value, by adjusting energy the signal, and converts the waveform of a signal, not extracted on the basis of the particular feature value, into a waveform having a frequency band different from the frequency of the signal while maintaining energy of the signal.

14. A vibration control method for controlling a vibration generated by a vibration apparatus using a signal, comprising:
converting a waveform of the signal while maintaining energy of the signal and converting the waveform of the signal into a waveform having a frequency band different from a frequency of the signal; and
dividing a component of the signal at intervals of a predetermined time, wherein
the converting is configured to convert the waveform of the signal in a unit of the predetermined time.

15. A vibration control method for controlling a vibration generated by a vibration apparatus using a signal, comprising:
dividing the signal at intervals of a predetermined time; and
converting the waveform of the signal in a unit of the divided predetermined time, wherein
the converting converts the waveform of a signal having a specific frequency band among frequency components of the signal by adjusting energy of the signal, and converting the waveform of a signal having a frequency band except for the specific frequency into a waveform having a frequency band different from the frequency of the signal while maintaining energy of the signal.

16. A vibration control method for controlling a vibration generated by a vibration apparatus using a signal, comprising:
dividing the signal at intervals of a predetermined time; and
converting the waveform of the signal in a unit of the divided predetermined time, wherein
the converting converts the waveform of a signal, extracted on the basis of a particular feature value, by adjusting energy the signal, and converting the waveform of a signal, not extracted on the basis of the particular feature value, into a waveform having a frequency band different from the frequency of the signal while maintaining energy of the signal.

* * * * *